US009664786B2

(12) United States Patent
Kim

(10) Patent No.: US 9,664,786 B2
(45) Date of Patent: May 30, 2017

(54) METHOD AND APPARATUS FOR DISTANCE MEASURING EQUIPMENT (DME/NORMAL) USING ALTERNATIVE PULSE SHAPES

(71) Applicant: SELEX ES INC., Overland Park, KS (US)

(72) Inventor: Euiho Kim, Overland Park, KS (US)

(73) Assignee: SELEX ES INC., Overland Park, KS (US)

( * ) Notice: Subject to any disclaimer, the term of this patent is extended or adjusted under 35 U.S.C. 154(b) by 264 days.

(21) Appl. No.: 14/337,133

(22) Filed: Jul. 21, 2014

(65) Prior Publication Data

US 2015/0054526 A1 Feb. 26, 2015

Related U.S. Application Data

(60) Provisional application No. 61/868,205, filed on Aug. 21, 2013.

(51) Int. Cl.
*G01B 7/00* (2006.01)
*G01S 13/78* (2006.01)

(52) U.S. Cl.
CPC .................. *G01S 13/785* (2013.01)

(58) Field of Classification Search
CPC ........ G01S 13/785; G01S 11/02; G01S 13/70; G01S 13/76; G01S 13/787; G01S 5/0226; G01S 7/282; G01R 29/10; H03K 3/80
USPC ........... 324/635, 637, 644, 647; 342/35, 128
See application file for complete search history.

(56) References Cited

U.S. PATENT DOCUMENTS

| 3,824,592 A | * | 7/1974 | Mehltretter | G01S 13/931 342/128 |
| 3,870,993 A | * | 3/1975 | Biagi | G01S 13/785 342/47 |
| 3,969,725 A | * | 7/1976 | Couvillon | G01S 13/76 342/132 |
| 4,010,465 A | * | 3/1977 | Dodington | G01S 13/787 342/35 |

(Continued)

OTHER PUBLICATIONS

Notice of Publication, dated Feb. 26, 2015, for U.S. Appl. No. 14/337,130, 1 page.

(Continued)

*Primary Examiner* — Vincent Q Nguyen
(74) *Attorney, Agent, or Firm* — Kilpatrick Townsend & Stockton LLP

(57) ABSTRACT

A method for measuring distance includes transmitting a first pair of RF pulses from an airborne interrogator, where the first pair of RF pulses are temporally separated from each other by a first time interval and each of the RF pulses in the first pair of RF pulses has a first pulse waveform. The method also includes receiving a second pair of RF pulses transmitted by a ground transponder. The RF pulses in the second pair of RF pulses have a second pulse waveform characterized by a filtered asymmetric Gaussian function or a smoothed trapezoidal function. The method further includes determining an elapsed time between transmitting the first pair of RF pulses and receiving the second pair of RF pulses and determining a distance between the airborne interrogator and the ground transponder based on at least the elapsed time.

18 Claims, 18 Drawing Sheets

(56) References Cited

U.S. PATENT DOCUMENTS

2008/0304043 A1    12/2008   Benz et al.
2015/0054525 A1     2/2015   Kim

OTHER PUBLICATIONS

Non-Final Office Action dated Jun. 20, 2016, for U.S. Appl. No. 14/337,130, 11 pages.

\* cited by examiner

METHOD AND APPARATUS FOR DISTANCE MEASURING EQUIPMENT (DME/NORMAL) USING ALTERNATIVE PULSE SHAPES

CROSS-REFERENCE TO RELATED APPLICATIONS

This application claims the benefit of U.S. Provisional Patent Application No. 61/868,205, filed Aug. 21, 2013, entitled "Method and Apparatus for Distance Measuring Equipment (DME/NORMAL) Using Alternative Pulse Shapes", both of which are commonly assigned, the disclosures of which are hereby incorporated by reference in their entirety.

BACKGROUND OF THE INVENTION

Distance Measuring Equipment (DME) is a pulse ranging system as illustrated in FIG. 18, used to measure the slant range between the airborne interrogator 1804 (typically on an aircraft 1802 or satellite) and the ground transponder 1812 (typically with an antenna 1810 to transmit the pulses). DME is typically categorized as DME/N (Normal) and DME/P (Precision). These two systems use different pulse shapes that support their own operational purposes. The DME/N has been used for traditional rho/theta as well as for en-route and limited terminal area navigation (RNA V). On the other hand, the DME/P use is limited to Micro Landing System (MLS) approach and landing applications. Current DME specifications do not require a particular pulse shape, but specify the allowable ranges of pulse shape parameters such as rise time, width, and fall time.

The common pulse shape used for DME/N is a Gaussian pulse. The Gaussian pulse has a rise time of 2.5 µs and a narrow spectral density that can be transmitted up to 1,000 Watts. In turn, the typical DME/P pulse shape is the Cos/Cos$^2$ pulse. The Cos/Cos$^2$ pulse has a much faster rise time than the Gaussian pulse, which provides the much higher range accuracy. However, this higher accuracy comes at the expense of the increased spectral density, which limits its transmission power to 100 Watts to prevent interference on adjacent channels. Thus, the coverage of the DME/P ground station is substantially smaller than that of a DME/N ground station.

Therefore, there is a need in the art for improvements in DME systems.

SUMMARY OF THE INVENTION

This present invention relates generally to ranging systems. More particularly, the invention provides a method and apparatus for Distance Measuring Equipment/Normal (DME/N) using alternative pulse waveforms. Merely by way of example, the invention has been applied to methods and systems that provide improved range accuracy over standard Gaussian pulse waveforms without a loss of coverage.

According to an embodiment of the present invention, an alternative DME/N pulse shape is utilized that provides much higher range accuracy than the conventional Gaussian pulse shape, and at the same time, has spectral density characteristics such that it does not cause interference to adjacent channels even when it is transmitted at the same high power of 1,000 Watts as the traditional Gaussian pulse.

As described herein, an alternative DME pulse waveform is provided by some embodiments is compliant with the pulse shape requirements in the current DME specifications to maintain the compatibility with existing DME ground transponders and avionics.

According to an embodiment of the present invention, a method of measuring distance is provided. Merely by way of example, the invention has been applied to a method. The method includes transmitting a first pair of RF pulses from an airborne interrogator, wherein the RF pulses in the first pair of RF pulses are temporally separated from each other by a first time interval, and each of RF pulses in the first pair of RF pulses has a first pulse waveform; receiving, at the airborne interrogator, a second pair of RF pulses transmitted by a ground transponder after the ground transponder has received the first pair of RF pulses transmitted by the airborne interrogator, wherein the RF pulses in the second pair of RF pulses are temporally separated from each other by a second time interval, and each of the RF pulses in the second pair of RF pulses has a second pulse waveform characterized by a smoothed concave hexagonal function, wherein the hexagonal function is characterized by a first segment having a first positive slope, a second flat segment, a third segment having a second negative slope, a fourth segment having a third negative slope, and a fifth segment having a fourth negative slope, an absolute value of the third negative slope being less than an absolute value of the second negative slope; determining an elapsed time between transmitting the first pair of RF pulses and receiving the second pair of RF pulses; and determining a distance between the airborne interrogator and the ground transponder based on at least the elapsed time.

According to an embodiment of the present invention, a method of measuring distance is provided. Merely by way of example, the invention has been applied to a method. The method includes receiving, at a ground transponder, a first pair of RF pulses transmitted from an airborne interrogator, wherein the RF pulses in the first pair of RF pulses are temporally separated from each other by a first time interval, and wherein each of the RF pulses in the first pair of RF pulses has a first pulse waveform; and transmitting, at the ground transponder and after receiving the first pair of RF pulses, a second pair of RF pulses, wherein the RF pulses in the second pair of RF pulses are temporally separated from each other by a second time interval, and each of the RF pulses in the second pair of RF pulses has a second pulse waveform characterized by a smoothed concave polygonal function, wherein the polygonal function is characterized by at least a first segment having a first positive slope, a second flat segment, a third segment having a second negative slope, and a fourth segment having a third negative slope, and a fifth segment having a fourth negative slope, an absolute value of the third negative slope being less than an absolute value of the second negative slope; whereby the second pair of RF pulses is received by the airborne interrogator, and a distance between the airborne interrogator and the ground transponder is determined based on at least an elapsed time between transmitting the first pair of RF pulses and receiving the second pair of RF pulses.

According to an embodiment of the present invention, a method of measuring distance is provided. Merely by way of example, the invention has been applied to a method. The method includes receiving, at a ground transponder, a first pair of RF pulses transmitted from an airborne interrogator, wherein the RF pulses in the first pair of RF pulses are temporally separated from each other by a first time interval, and wherein each of the RF pulses in the first pair of RF pulses has a first pulse waveform; and transmitting, at the ground transponder and after receiving the first pair of RF pulses, a second pair of RF pulses, wherein the RF pulses in the second pair of RF pulses are temporally separated from each other by a second time interval, and each of the RF pulses in the second pair of RF pulses has a second pulse waveform characterized by a smoothed concave polygonal function, wherein the polygonal function is characterized by at least a first segment having a first positive slope, a second flat segment, a third segment having a second negative slope, and a fourth segment having a third negative slope, and a fifth segment having a fourth negative slope, an absolute value of the third negative slope being less than an absolute value of the second negative slope; whereby the second pair of RF pulses is received by the airborne interrogator, and a distance between the airborne interrogator and the ground transponder is determined based on at least an elapsed time between transmitting the first pair of RF pulses and receiving the second pair of RF pulses.

According to another embodiment of the present invention, a system for distance measuring is provided. Merely by way of example, the system includes an airborne interrogator operable to transmit a first pair of RF pulses, wherein the RF pulses in the first pair of RF pulses are temporally separated from each other by a first time interval, and each of the RF pulses in the first pair of RF pulses has a first pulse waveform; and a ground transponder operable to receive the first pair of RF pulses transmitted by the airborne interrogator, and to transmit a second pair of RF pulses after receiving the first pair of RF pulses, wherein the RF pulses in the second pair of RF pulses are temporally separated from each other by a second time interval, and each of the RF pulses in the second pair of RF pulses has a second pulse waveform characterized by a smoothed concave polygonal function, wherein the polygonal function is characterized by at least a first segment having a first positive slope, a second flat segment, a third segment having a second negative slope, and a fourth segment having a third negative slope, and a fifth segment having a fourth negative slope, an absolute value of the third negative slope being less than an absolute value of the second negative slope; wherein the airborne interrogator is further operable to receive the second pair of RF pulses transmitted by the ground transponder, whereby a distance between the airborne interrogator and the ground transponder is determined based on at least an elapsed time between transmitting the first pair of RF pulses and receiving the second pair of RF pulses.

According to an embodiment of the present invention, a method of measuring distance is provided. Merely by way of example, the invention has been applied to a method. The method includes transmitting a first pair of RF pulses from an airborne interrogator, wherein the RF pulses in the first pair of RF pulses are temporally separated from each other by a first time interval, and wherein each of the RF pulses in the first pair of RF pulses has a first pulse waveform; receiving, at the airborne interrogator, a second pair of RF pulses transmitted by a ground transponder after the ground transponder has received the first pair of RF pulses transmitted from the airborne interrogator, wherein the RF pulses in the second pair of RF pulses are temporally separated from each other by a second time interval, and wherein each of the RF pulses in the second pair of RF pulses has a second pulse waveform characterized by an a filtered asymmetric Gaussian function; determining an elapsed time between transmitting the first pair of RF pulses and receiving the second pair of RF pulses; and determining a distance between the airborne interrogator and the ground transponder based on at least the elapsed time.

According to an embodiment of the present invention, a method of measuring distance is provided. Merely by way of example, the invention has been applied to a method. The method includes transmitting a first pair of RF pulses from an airborne interrogator, wherein the RF pulses in the first pair of RF pulses are temporally separated from each other by a first time interval, and wherein each of the RF pulses in the first pair of RF pulses has a first pulse waveform; receiving, at the airborne interrogator, a second pair of RF pulses transmitted by a ground transponder after the ground transponder has received the first pair of RF pulses transmitted by the airborne interrogator, wherein the RF pulses in the second pair of RF pulses are temporally separated from each other by a second time interval, and wherein each of the RF pulses in the second pair of RF pulses has a second pulse waveform characterized by a smoothed trapezoidal function, wherein the trapezoidal function is characterized by a first segment having a first positive slope, a second flat segment, and a third segment having a second negative slope, an absolute value of the first positive slope being greater than an absolute value of the second negative slope; determining an elapsed time between transmitting the first pair of RF pulses and receiving the second pair of RF pulses; and determining a distance between the airborne interrogator and the ground transponder based on at least the elapsed time.

According to another embodiment of the present invention, a system for distance measuring is provided. Merely by way of example, the system includes an airborne interrogator operable to transmit a first pair of RF pulses, wherein the RF pulses in the first pair of RF pulses are temporally separated from each other by a first time interval, and each of the RF pulses in the first pair of RF pulses has a first pulse waveform; and a ground transponder operable to receive the first pair of RF pulses transmitted by the airborne interrogator, and to transmit a second pair of RF pulses after receiving the first pair of RF pulses, wherein the RF pulses in the second pair of RF pulses are temporally separated from each other by a second time interval, and each of the RF pulses in the second pair of RF pulses has a second pulse waveform characterized by a waveform function, the waveform function including a filtered asymmetric Gaussian function or smoothed trapezoidal function; wherein the airborne interrogator is further operable to receive the second pair of RF pulses transmitted by the ground transponder, whereby a distance between the airborne interrogator and the ground transponder is determined based on at least an elapsed time between transmitting the first pair of RF pulses and receiving the second pair of RF pulses.

According to another embodiment of the present invention, a system is provided. The system includes a processor and a computer readable medium coupled to the process. The computer readable medium can comprise instructions that cause the processor to implement a method. The method may include one or more methods described herein.

Numerous benefits are achieved by way of the present invention over conventional techniques. For example, embodiments of the present invention provide the compatibility with legacy DME avionics and ground transponder, noise suppression, multipath resistance, and uncompromised service coverage area. These and other embodiments of the invention along with many of its advantages and features are described in more detail in conjunction with the text below and attached figures.

DETAILED DESCRIPTION OF SPECIFIC EMBODIMENTS

Figure 1:
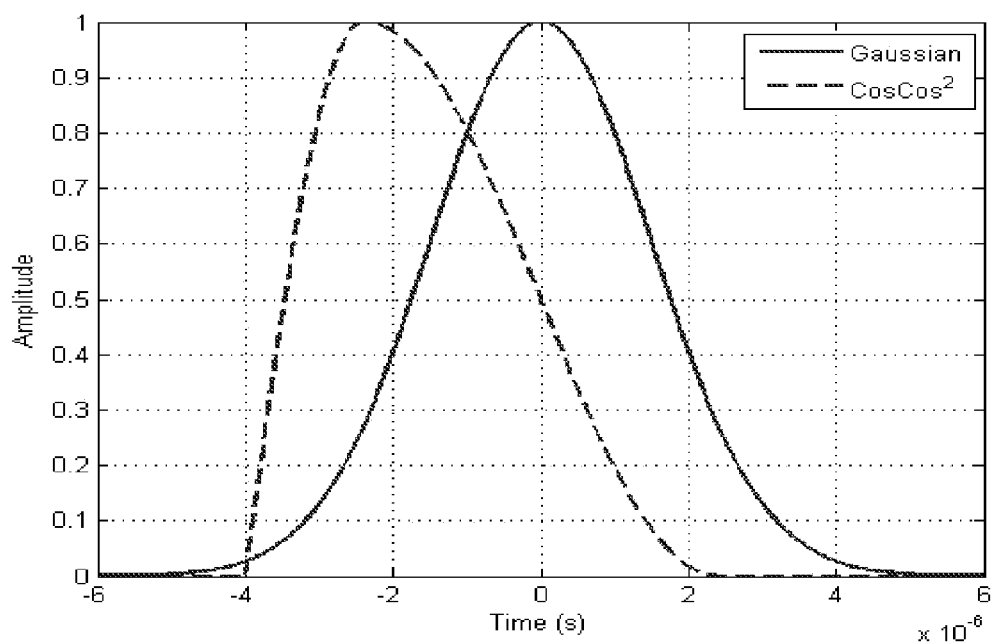
FIG. 1 illustrates a Gaussian pulse shape used in a conventional Distance Measuring Equipment/Normal (DME/N) and a Cos/Cos² pulse shape used in a conventional Distance Measuring Equipment/Precision (DME/P).

This present invention relates generally to ranging systems. More particularly, the invention provides a method and apparatus for Distance Measuring Equipment/Normal (DME/N) using alternative pulse waveforms. Merely by way of example, the invention has been applied to methods and systems that provide improved range accuracy over standard Gaussian pulse waveforms without a loss of coverage. Some embodiments of the present invention provide improved range accuracy over the standard Gaussian pulse waveform without a loss of coverage.

The Distance Measuring Equipment (DME, DME/Normal) based navigation method known as DME/DME positioning has been proposed as one of the possible Alternative Position, Navigation, and Timing (APNT) services for aviation during the outage of the Global Navigation Satellite Systems. A DME interrogator measures the slant range to a DME transponder by means of the elapsed time in exchanging a pair of DME pulses. Typically, the DME pulse is a Gaussian pulse, and the achievable DME ranging accuracy is primarily determined by the pulse shape. Embodiments of the present invention utilize an alternative DME pulse waveform that is able to provide much higher range accuracy than the conventional Gaussian pulse. The alternative pulse waveform is compliant with the pulse shape requirements in the current DME specifications to maintain the compatibility with existing DME ground transponders and avionics. This alternative DME pulse also takes into account the spectral density characteristics so that it does not cause interference to adjacent channels, even when it is transmitted at the same high power of 1,000 Watts as the traditional Gaussian pulse. Herein, the design approaches used to determine the alternative DME pulse shape are described and the improvement of range accuracy and multipath mitigation is compared to the traditional Gaussian pulse. In addition, implementation of the alternative pulse in the existing transponders and avionics is discussed.

The Federal Aviation Administration (FAA) has recently initiated an Alternative Position, Navigation, and Timing (APNT) program to maintain safe air traffic control operations during the possible outage of Global Navigation Satellite Systems (GNSS). One of the APNT architectures proposed by the FAA is based on DME/DME (DME/N) positioning that utilizes two or more DME ground transponders as ranging sources to enable horizontal navigation. The alternative DME/N pulse provided by embodiments of the present invention enables DME/DME positioning, meets DME spectrum requirements, and maintains compatibility with existing DME airborne interrogators.

DME/N Pulse Requirements

The DME/N pulse shape requirements largely consist of the pulse shape parameters and spectral density. The DME/N pulse shape requirements of the ground transponder are listed in Table 1. The rise time is the time required to rise from 10% to 90% of the peak voltage amplitude in the leading edge. The fall time is the time required to fall from 90% to 10% of the peak voltage amplitude in the trailing edge. The pulse duration is the time between the points of 50% of the peak voltage amplitude in the leading and trailing edges.

TABLE 1

| DME/N Ground Transponder Pulse Shape Requirements | |
|---|---|
| Pulse Shape Parameters | Range |
| Rise Time | 2.5 (+0.5, −1.0) µs |
| Pulse Top | No instantaneous fall below a value which is 95% of the maximum voltage amplitude of the pulse |
| Pulse Duration (width) | 3.5 (±0.5) µs |
| Fall Time | 2.5 (±0.5) µs |

The DME RF pulse signal spectrum requirement is as follows:

RF Pulse Signal Spectrum: The spectrum of the pulse modulated signal is such that during the pulse, the effective radiated power contained in a 0.5 MHz band centered on frequencies 0.8 MHz above and 0.8 MHz below the nominal channel frequency in each case does not exceed 200 mW (23 dBm), and the effective radiated power contained in a 0.5 MHz band centered on frequencies 2 MHz above and 2 MHz below the nominal channel frequency in each case does not exceed 2 mW (3 dBm). The effective radiated power contained within any 0.5 MHz band decreases monotonically as the band center frequency moves away from the nominal channel frequency.

The Effective Radiated Power (ERP) is defined as the product of the power supplied to the antenna and the antenna gain relative to a half wave dipole in a given direction. The power supplied to the antenna in the requirement is the average power in a 0.5 MHz frequency band centered on either ±0.8 MHz or ±2 MHz away from the center frequency of a DME channel. Then, the ERP, $P_{ERP}$, can be formulated as follows:

$$P_{ERP} = P_{Avg} + G_{Ant} + \text{EIRP}_{Conv} + L_{Cable} + D \text{ in dB} \quad (1)$$

where $P_{Avg}$ is the average transmission power in an interested frequency band, $G_{Ant}$ is an antenna gain, $\text{EIRP}_{Conv}$ is the conversion factor between ERP and Effective Radiated Isotropic Power (EIRP), $L_{Cable}$ is a cable loss from the DME transmitter to an antenna, and D is the duty cycle factor that is the ratio of average power to peak power. Given the operational values of those parameters and the allowed $P_{ERP}$, the maximum average transmission power in the interested frequency band, $P_{Thr}$, can be determined from solving equation (1).

Table 2 shows sample calculations of $P_{Thr}$ in the two designated frequency bands with typical DME operational values of the parameters in equation (1). Note that the duty cycle factor is based on the peak power of 1,000 watts and Pulse Repetition Frequency (PRF) of 4,800 pulse pairs per second (ppps). $P_{Thr}$ in Table 2 will be used as the threshold of an average transmission power in the given frequency bands in searching for an alternative DME/N pulse assuming that the alternative pulse is used in the same operation conditions.

TABLE 2

Sample Calculations of Allowable Transmission Power Across Given Frequency Band

| Offset from Center Frequency | ±0.8 MHz | ±2 MHz |
|---|---|---|
| $P_{ERP}$ (dBm) | 23 | 3 |
| $G_{Ant}$ (dB) | 9 | 9 |
| $\text{EIRP}_{Conv}$ (dBi) | −2.15 | −2.15 |
| $L_{Cable}$ (dB) | −2.6 | −2.6 |
| D (dB) with peak power = 1000 watt and PRF = 4800 ppps | 16.21 | 16.21 |
| $P_{Thr}$ (dBm) | 2.54 | −17.5 |

Gaussian DME/N Pulse Shape and Spectral Density

A Gaussian DME/N pulse is a commonly used DME/N pulse and can be formulated as follows $$f(t, \mu, \sigma) = e^{-\frac{(t-\mu)^2}{2\sigma^2}} \quad (2)$$

where t is time, μ is the mean time when the peak voltage amplitude occurs, and σ is the standard deviation of the pulse. FIG. 1 shows a Gaussian DME/N pulse having 2.5 μs rise and fall time and 3.5 μs width. The amplitude of the Gaussian pulse in FIG. 1 represents normalized voltages. In DME/N operation, the interrogation pulse is coded in pairs with a nominal spacing of 12 μs (X mode) or 36 μs (Y mode). The reply pulse is coded in pairs with a nominal spacing of 12 μs (X mode) or 30 μs (Y mode). The spacing is defined as the time duration between the 50% points of the peak amplitude at the leading edges in the first and the second pulses. FIG. 1 also shows Cos/Cos² DME/P pulse for comparison.

The DME spectrum requirement is based on the average power or channel power. Designating s(f) as the spectral density of the Gaussian pulse f(t), the average power within a given frequency band is computed from $$P_{avg}(f1, f2) = \frac{1}{f_2 - f_1} \int_{f1}^{f2} |s(f)|^2 \, df \quad (3)$$

where $f_1$ and $f_2$ are the minimum and the maximum frequencies in the given frequency band. $P_{avg}$ within 0.5 MHz frequency band at ±0.8 MHz or ±2 MHz are approximately −36 dBm and −43 dBm, respectively. $P_{avg}$ is much lower than $P_{Thr}$, therefore we can see that the ideal Gaussian DME/N pulse has sufficient spectrum margins.

Figure 2:
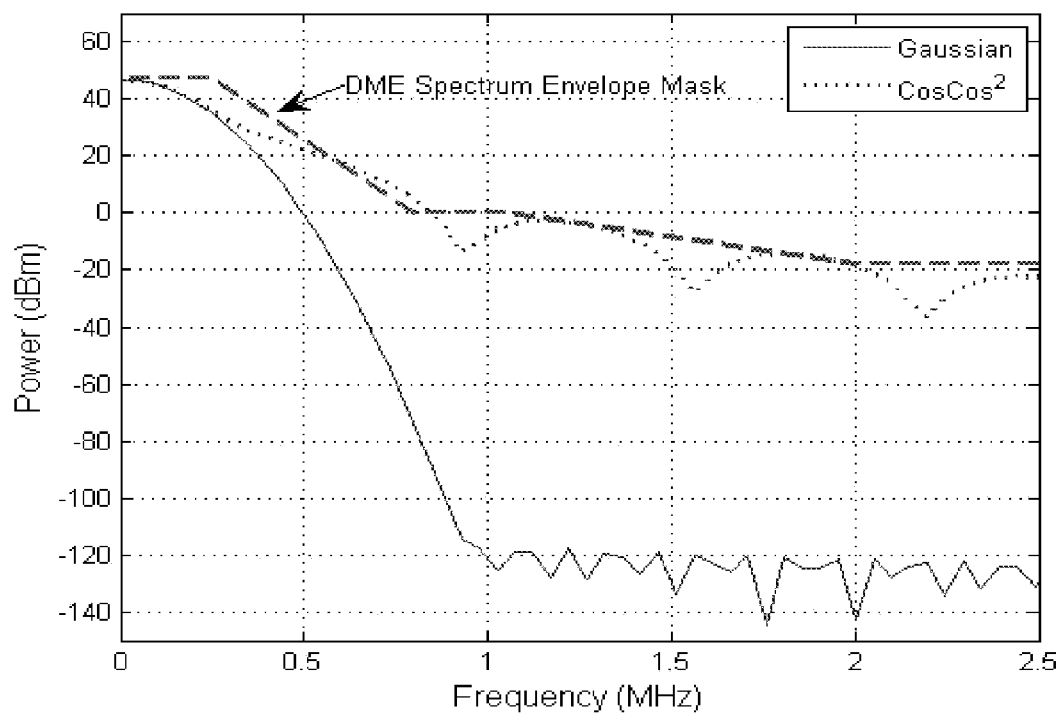
FIG. 2 illustrates power spectra of a Gaussian DME/N pulse and a Cos/Cos² DME/P pulse against a DME spectrum envelope mask.

Although the DME spectrum requirement uses the channel power at the two given frequencies, it is more intuitive to compare the power spectrum, rather than the power spectrum density, of a pulse against a spectrum envelope mask to check the overall compliance of the spectrum requirement. FIG. 2 shows the power spectrums (dBm) of the Gaussian DME/N pulse and Cos/Cos² DME/P pulse with the DME spectrum envelope mask. The peak pulse power transmission is assumed to be 1,000 Watts (60 dBm). In FIG. 2, the power spectrum of the Gaussian pulse shows a significant margin against the spectrum envelope mask, but the Cos/Cos² DME/P pulse exceeds the mask in several frequencies. Note that the envelope mask is not a requirement but a practical representation of the minimum power spectrum attenuation over the frequencies.

Alternative DME/N Pulse Shapes

The inventor has considered multiple factors in developing an alternative DME/N pulse. First, the targeted DME/N pulse should provide significant ranging accuracy improvement enough to motivate the implementation of the alternative pulse. Second, the pulse shape should comply with the DME/N pulse shape requirement in Table 1 to be processed without changes in DME transponder or avionics. Third, the spectrum of the alternative pulse should be narrow enough to allow a high transmission power up to 1,000 Watts without violating the DME spectrum requirement. The existing DME transponder with the standard Gaussian pulse typically broadcasts replies with 1,000 Watts peak power.

One or more of these factors may be implemented in the alternative DME/N pulse shapes to improve a standard Gaussian DME/N pulse shape and spectral density. For example, the alternative DME/N pulse shapes may broadcast replies the 1,000 Watt transmission power with minimal interference between adjacent channels. The power spectrum and/or frequency domain of the pulse may be relatively narrow to minimize the interference between the channels. The alternative DME/N pulse shapes may also include a specified right leading-edge rise time, duration, and fall time that meet the DME specification and power spectrum requirements. In some embodiments, the noise (e.g., through the specified rise time) and a multipath impact may be mitigated, so that the combination of the rise time, fall time, power, and the ability to mitigate the noise through these aspects provides improved alternative DME/N pulse shapes.

The use of the alternative DME/N pulse shapes also offer several improvements over other systems. For example, at least some of the alternative DME/N pulse shapes may travel at least 200 nautical miles through the use of the 1,000 Watt transmission power. The power spectrum of the pulse may be implemented to provide little to no interference between channels, allowing the pulses to travel significant distances (e.g., approximately 100 nautical miles) between DME/N ground stations.

Methodology in Searching for Alternative DME/N Pulse Shapes

The inventor has determined that three different alternative DME/N pulses can be utilized in conjunction with embodiments of the present invention: asymmetric Gaussian pulse (AGP), smoothed trapezoidal pulse (STP), and smoothed concave hexagonal pulse (SCP).

Filtered or Unfiltered Asymmetric Gaussian Pulse (AGP)

An asymmetric Gaussian pulse (AGP) has different standard deviations (a) in the left and right sides (i.e., the rising edge and the falling edge, respectively) of the distribution. An asymmetric normalized Gaussian pulse shape can be formulated as follows:

$$g(x, \mu, \sigma_1, \sigma_2) = \begin{cases} e^{-\frac{(x-\mu)^2}{2\sigma_L^2}} & \text{if } x \leq \mu, \\ e^{-\frac{(x-\mu)^2}{2\sigma_R^2}} & \text{otherwise.} \end{cases} \quad (4)$$

Since the asymmetric Gaussian pulse should comply with the pulse width defined at the half amplitude, the relationship between $\sigma_L$ and $\sigma_R$ can be formulated using the following process. First, take $\mu=0$ and the peak amplitude of the pulse as one for a simplified equation. Defining $x_{L,1/2}$ the time corresponding to the half amplitude point of the left hand side Gaussian pulse, then $$e^{-\frac{x_{L,1/2}^2}{2\sigma_L^2}} = \frac{1}{2}. \quad (5)$$

Rearranging (5) for $x_{L,1/2}$ is $$x_{L,1/2} = -\sqrt{-2\ln\left(\frac{1}{2}\right)\sigma_L^2}. \quad (6)$$

Next, the width of the pulse is defined as $$W = x_{R,1/2} - x_{L,1/2} \quad (7)$$

where $X_{R,1/2}$ is the time corresponding to the half amplitude point of the right hand side of the Gaussian pulse as below $$x_{R,1/2} = \sqrt{-2\ln\left(\frac{1}{2}\right)\sigma_R^2}. \quad (8)$$

Inserting equation (6) and (8) to (7), $\sigma_R$ can be formulated as follows $$\sigma_R = \frac{W + \sigma_L\sqrt{-2\ln\left(\frac{1}{2}\right)}}{\sqrt{-2\ln\left(\frac{1}{2}\right)}}. \quad (9)$$

Using the relationship in (9), $\sigma_L$ and W can be varied to find a candidate set of the targeted alternative DME/N pulse. After combining the two Gaussian pulses, it may be necessary to round the peak of the resultant asymmetric Gaussian pulse by using a smoothing filter when the slopes of the two Gaussian distribution are largely different and make a near discontinuity. In some embodiments, the smoothing filter may create a filtered asymmetric Gaussian pulse ("filtered asymmetric Gaussian pulse" and "asymmetric Gaussian pulse" are used interchangeably). The range of W is from 3.0 µs to 4.0 µs as listed in Table 1. With the range of W, $\sigma_L$ from 0.77 µs to 1.77 µs could generate a large set of AGP that meets the DME pulse shape and spectrum requirements. The range of $\sigma_R$ may be from 0.90 µs to 1.78 µs according to embodiments of the invention.

Figure 3:
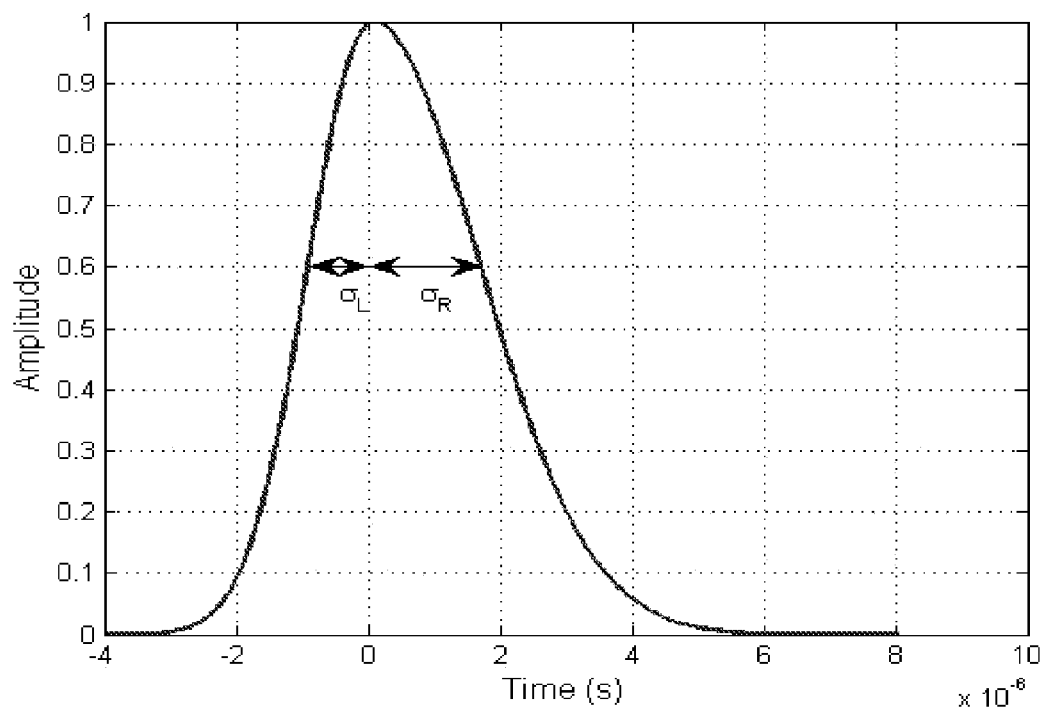
FIG. 3 illustrates a filtered asymmetric Gaussian pulse shape for DME/N according to an embodiment of the invention.

One example of an AGP having $\sigma_L=0.86$ µs and $\sigma_R=1.66$ µs is shown in FIG. 3 according to an embodiment. Its rise time, width, and fall time is 1.57 µs, 3.06 µs, and 2.81 µs, respectively. It should be noted that other values of $\sigma_L$ and $\sigma_R$ may be used according to other embodiments of the invention. One of ordinary skill in the art would recognize many variations, alternatives, and modifications. In some embodiments, $\sigma_L$ is in a range from about 0.77 µs to about 1.0 µs.

Smoothed Trapezoidal Pulse (STP)

Figure 4:
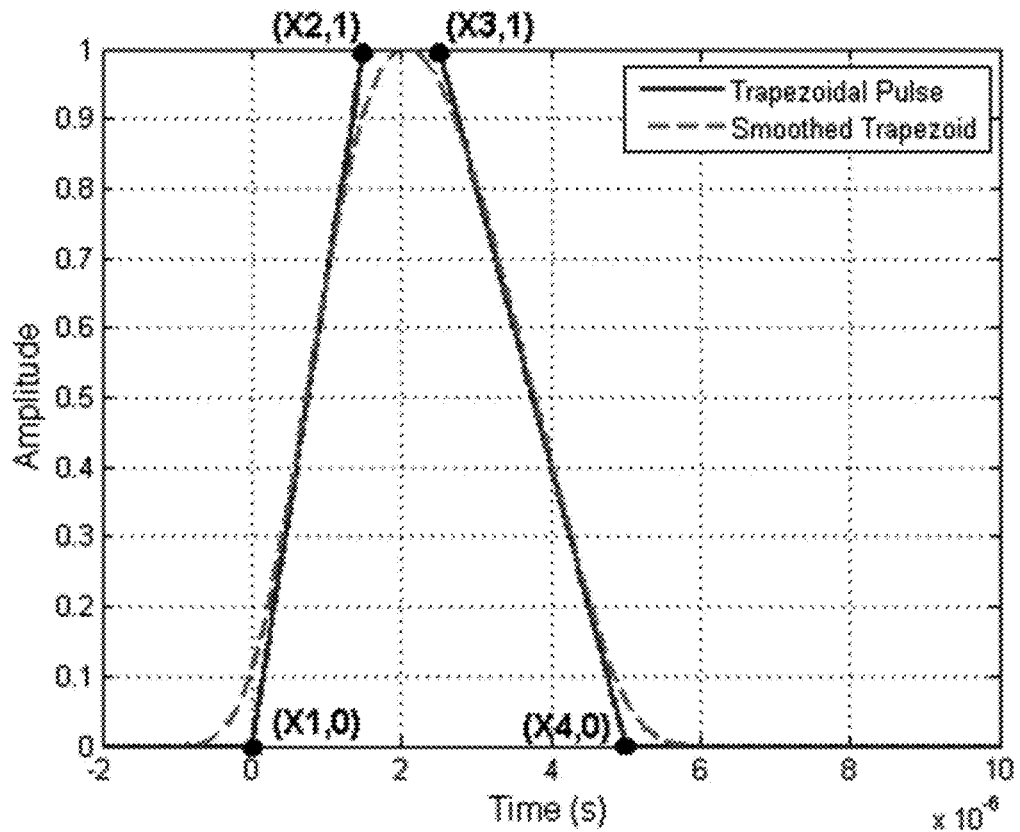
FIG. 4 illustrates a smoothed trapezoidal pulse shape for DME/N according to an embodiment of the invention.

According to another embodiment of the present invention, a trapezoidal pulse is used as a baseline pulse shape as shown in FIG. 4, which illustrates a smoothed trapenoidal pulse shape for DME/N according to an embodiment of the invention. The baseline trapezoidal pulse waveform is characterized by a first segment defined by coordinates (X1, 0) and (X2, 1), a second segment defined by coordinates (X2, 1) and (X3, 1), and a third segment defined by coordinates (X3, 1) and (X4, 0). The first segment has a first positive slope; the second segment is flat; and the third segment has a second negative slope.

The sharp corners of the baseline trapezoidal pulse would result in excessive spectral energy in high frequency region that may not meet the DME spectrum requirement although the baseline pulse could meet the DME pulse shape requirement. Therefore, a smoothing filter can be used to round the sharp corners of the baseline trapezoidal pulses such that the smoothed pulses have sufficient low powers at the frequencies beyond the center frequency region of a DME. According to some embodiments, the smoothing filter may be a moving average filter, a spline filter, a zero phase forward and backward digital filter, or the like.

The pulse design parameters are the locations of X1, X2, X3, X4, and the length of the smoothing window. (Note that Y1=0, Y2=1, Y3=1, and Y4=0, for a normalized pulse amplitude.) FIG. 4 shows one particular smoothed trapezoidal pulse (STP) having a rising time of 1.50 µs, a fall time of 2.13 µs, and pulse width of 3.04 µs according to an embodiment of the invention. It should be noted that other values of X1, X2, X3, and X4 may be used according to other embodiments of the invention. One of ordinary skill in the art would recognize many variations, alternatives, and modifications. In some embodiments, X1 may be defined to be 0 without losing generality. X2 may be in a range from about 1 μs to about 3 μs; X3 may be in a range from about 1.5 μs to about 5.1 μs; and X4 may be in a range from about 3.6 μs to about 7.0 μs. In some embodiments, the first segment of the baseline trapezoidal pulse waveform has a positive slope that is greater than about 0.7 μs$^{-1}$.

Smoothed Concave Hexagonal Pulse (SCP)

Figure 5:
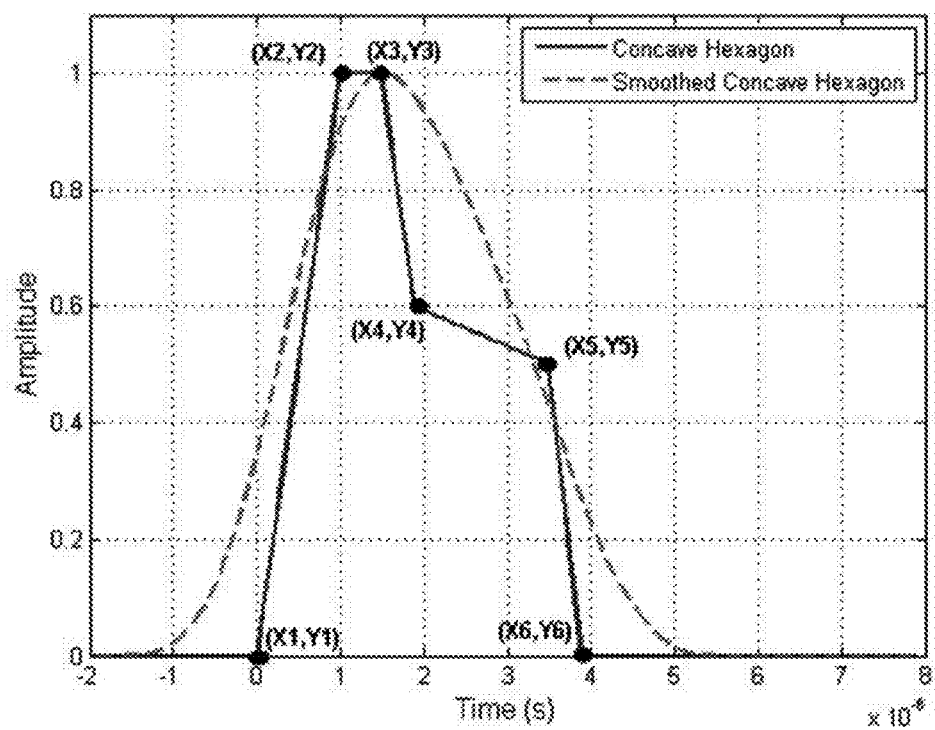
FIG. 5 illustrates a smoothed concave hexagonal pulse shape for DME/N according to an embodiment of the invention.

According to yet another embodiment of the present invention, a smoothed concave hexagonal pulse is utilized. In some ways similar to the trapezoidal pulse, the baseline pulse has a concave shape and additional degrees of freedom. The concave hexagon in FIG. 5 is presented as an example and shows a preferred hexagonal shape. The baseline concave hexagonal pulse waveform is characterized by a first segment defined by coordinates (X1, Y1) and (X2, Y2), a second segment defined by coordinates (X2, Y2) and (X3, Y3), a third segment defined by coordinates (X3, Y3) and (X4, Y4), a fourth segment defined by coordinates (X4, Y4) and (X5, Y5), and a fifth segment defined by coordinates (X5, Y5) and (X6, Y6). In a particular implementation, the first segment has a first positive slope; the second segment is flat; the third segment has a second negative slope; and fourth segment has a third negative slope; and the fifth segment has a fourth negative slope. The absolute value of the third negative slope is less than the absolute value of the second negative slope, thereby giving rise to the concave hexagonal shape. The pulses generated from the concave hexagonal shape would have a narrow width around the peak that could help easily detect the peak of the first pulse (direct), thus mitigate multipath impacts except for very short delay multipath. A similar concave polygon with additional degrees of freedom can be used according to other embodiments of the invention.

The sharp corners of the baseline concave hexagonal pulse are rounded by using a smoothing filter to reduce power in the high frequency region in some implementations. The smoothed concave hexagonal pulse illustrated in FIG. 5 has a rise time of 1.56 μs, a fall time of 2.30 μs, and pulse width of 3.06 μs according to an embodiment of the invention. It should be noted that other values of (X1, Y1), (X2, Y2), (X3, Y3), (X4, Y4), (X5, Y5), and (X6, Y6) may be used according to other embodiments of the invention. One of ordinary skill in the art would recognize many variations, alternatives, and modifications. In some embodiments, X1 may be defined to be 0 without losing generality. X2 may be in a range from about 1 μs to about 3 μs; X3 may be in a range from about 1 μs to about 3.8 μs; X4 may be in a range from about 1.1 μs to about 4.7 μs; X5 may be in a range from about 3.5 μs to about 5.32 μs; and X6 may be in range from about 3.9 μs to about 7.72 μs. Y1 and Y6 may be defined to be 0, and Y2 and Y3 may be defined to be 1 for a normalized pulse amplitude. In some embodiments, Y4 may be in a range from about 0.5 to about 1; and Y5 may be about 0.5. In some embodiments, the first segment of the baseline concave hexagonal pulse waveform has a positive slope that is greater than about 0.7 μs$^{-1}$. In other embodiments, the absolute value of the second negative slope is greater than about 0.7 μs$^{-1}$.

Figure 6:
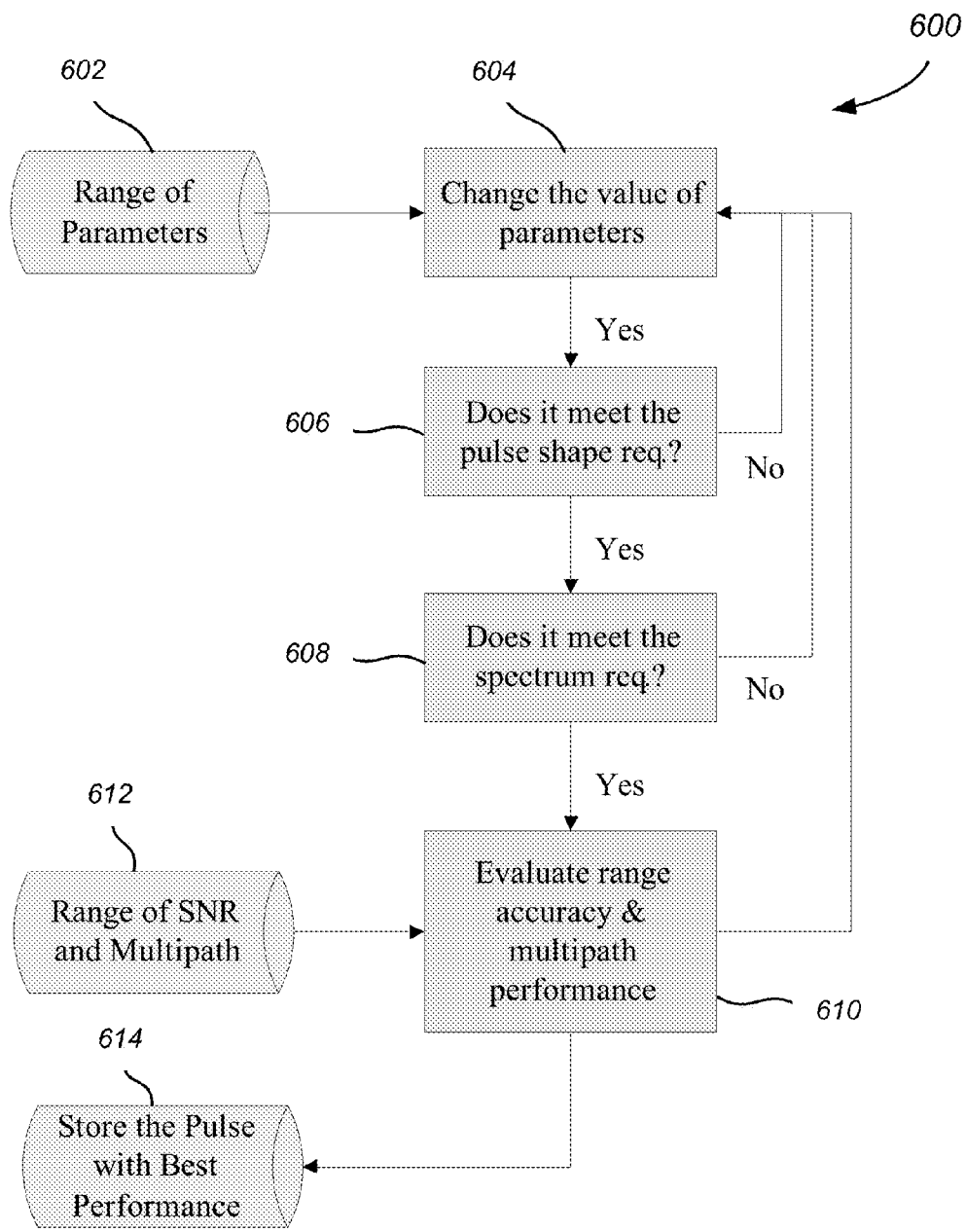
FIG. 6 is a simplified flowchart illustrating a method of searching for a candidate alternative pulse shape for DME/N according to an embodiment of the invention.

The alternative pulses described above were generated from following the procedures in FIG. 6. The optimal alternative pulse can be defined as the pulse that yields the minimum error in measuring time of arrival under noise and multipath while complying with the pulse shape requirement and the spectrum requirement given a transmission power of 1,000 Watts (60 dBm). The optimal pulses are designed to accommodate 10 dB margin or more against the spectrum thresholds at 0.8 MHz and 2 MHz to compensate for possible limitations of the DME transponder and/or avionics in implementing the pulses.

FIG. 6 is a simplified flowchart illustrating a method of computing an alternative pulse waveform for DME/N according to an embodiment of the invention. At 602, the system determines the ranges of parameters for the pulse waveform under consideration. At 604, one or more parameter values are changed within the determined ranges. At 606, the system checks whether the resultant pulse waveform meets the pulse shape requirements. If the answer is "no," the system loops back to 604 where one or more parameters are changed. If the answer is "yes," at 608, the system checks whether the resultant pulse waveform meets the spectrum requirements. If the answer is "no," the system loops back to 604 where one or more parameters are changed. If the answer is "yes," at 610, the system evaluates the range accuracy and multipath performance of the DME/N using the resultant pulse waveform. At 612, the system determines the ranges of signal-to-noise ratio (SNR) and multipath parameters (e.g., the peak amplitude ratio, r, of the direct and short distant echo) for the evaluation. The system loops back to 604 where one or more parameters are changed, and repeats steps 606-610 until a pulse waveform with the best performance is found. At 614, the pulse waveform with the best performance is stored.

It should be appreciated that the specific steps illustrated in FIG. 6 provide a particular method of computing alternative pulse waveforms for DME/N according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
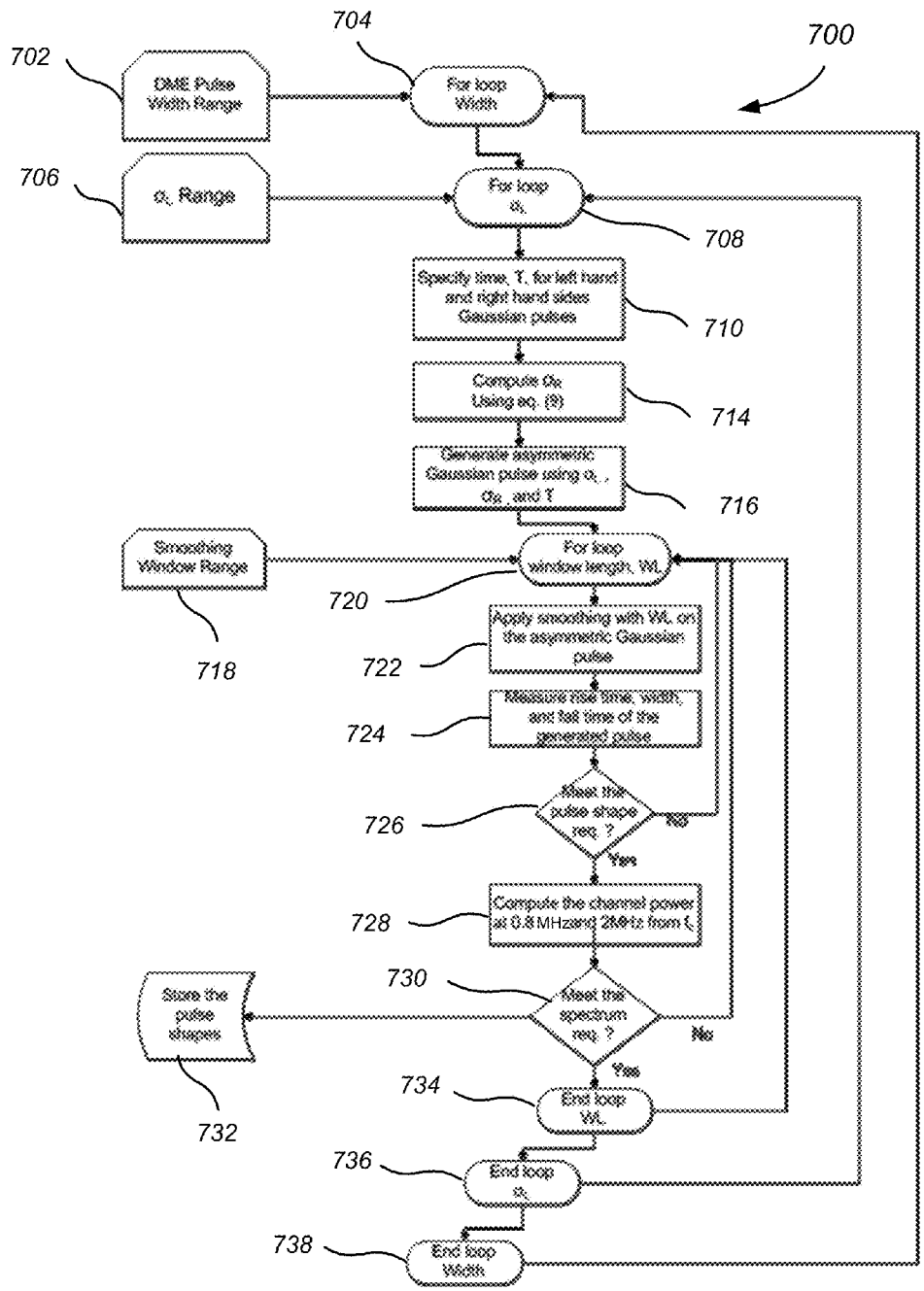
FIG. 7 is a simplified flowchart illustrating a method of searching for a candidate assymetric Gaussian pulse shape for DME/N according to an embodiment of the invention.

FIG. 7 is a simplified flowchart illustrating a method of computing a filtered asymmetric Gaussian pulse waveform for DME/N according to an embodiment of the invention. At 702, the system determines the range of the DME pulse width. At 704, the system starts the "pulse width" loop. At 706, the system determines the range of $\sigma_L$. At 708, the system starts the "$\sigma_L$" loop. At 710, the system specifies time, T, for the left-hand (i.e., the rising edge) and the right-hand (i.e., the falling edge) sides of a filtered asymmetric Gaussian pulse. At 714, the system computes $\sigma_R$ using equation (9). At 716, the system generates a filtered asymmetric Gaussian pulse waveform using $\sigma_L$, $\sigma_R$, and T. At 718, the system determines the range of the smoothing window. At 720, the system starts the "window length" (WL) loop. At 722, the system applies the smoothing width WL on the asymmetric Gaussian pulse waveform. At 724, the system determines the rise time, pulse width, and the fall time of the resultant asymmetric Gaussian pulse waveform. At 726, the system checks whether the resultant asymmetric Gaussian pulse waveform meets the pulse shape requirements. If the answer is "no," the system loops back to 720 where the window length WL is changed. If the answer is "yes," at 728, the system computes the channel power at 0.8 MHz and 2 MHz from the nominal channel frequency $f_c$. At 730, the system checks if the resultant asymmetric Gaussian pulse waveform meets the spectrum requirements. If the answer is "no," the system loops back to 720 where the window length WL is changed. If the answer is "yes," at 732, the resultant asymmetric Gaussian pulse waveform is stored. At 734, the system loops back to 720 where the window length WL is changed until all values of WL within the smoothing window range have been tried. At 736, the system loops back to 708 where $\sigma_L$ is changed until all values within the $\sigma_L$ range have been tried. At 738, the system loops back to 704 wherein the DME pulse width is changed until all values within the DME pulse width range have been tried.

It should be appreciated that the specific steps illustrated in FIG. 7 provide a particular method of computing a filtered asymmetric Gaussian pulse waveforms for DME/N according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
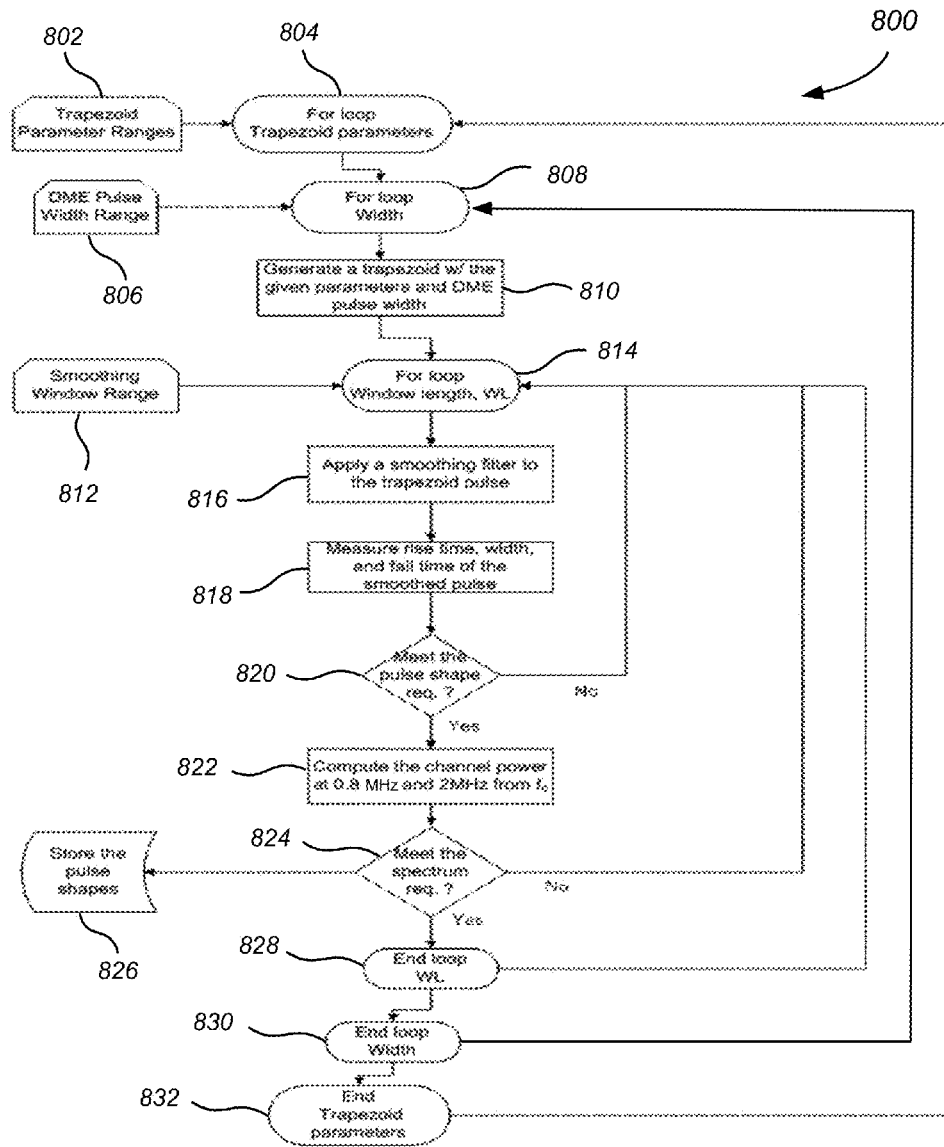
FIG. 8 is a simplified flowchart illustrating a method of searching for a candidate smoothed trapezoidal pulse shape for DME/N according to an embodiment of the invention.

FIG. 8 is a simplified flowchart illustrating a method of computing a smoothed trapezoidal pulse (STP) waveform for DME/N according to an embodiment of the invention. At 802, the system determines the ranges for the baseline trapezoidal pulse waveform. At 804, the system starts the trapezoidal parameter loop. At 806, the system determines the range for the DME pulse width. At 808, the system starts the "pulse width" loop. At 810, the system generates a baseline trapezoidal pulse waveform using the given trapezoidal parameters and DME pulse width. At 812, the system determines the range for the smoothing window. At 814, the system starts the "window length" (WL) loop. At 816, the system applies the smooth filter to the baseline trapezoidal pulse waveform. At 818, the system determines the rise time, pulse width, and the fall time of the smoothed trapezoidal pulse waveform. At 820, the system checks whether the resultant smoothed trapezoidal pulse waveform meets the pulse shape requirements. If the answer is "no," the system loops back to 814 where the smoothing window length WL is changed. If the answer is "yes," at 822, the system computes the channel power at 0.8 MHz and 2 MHz from the nominal channel frequency $f_c$. At 822, the system checks if the resultant smoothed trapezoidal pulse waveform meets the spectrum requirements. If the answer is "no," the system loops back to 814 where the smoothing window length is changed. If the answer is "yes," at 826, the system stores the resultant smoothed trapezoidal pulse waveform. At 828, the system loops back to 814 where the smoothing window length WL is changed until all values of WL within the smoothing window range have been tried. At 830, the system loops back to 808 where the DME pulse width is changed until all values within the DME pulse width range have been tried. At 832, the system loops back to 804 where the baseline trapezoidal waveform parameters are changed until all values within the trapezoid parameter range have been tried.

It should be appreciated that the specific steps illustrated in FIG. 8 provide a particular method of computing a smoothed trapezoidal pulse waveform for DME/N according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
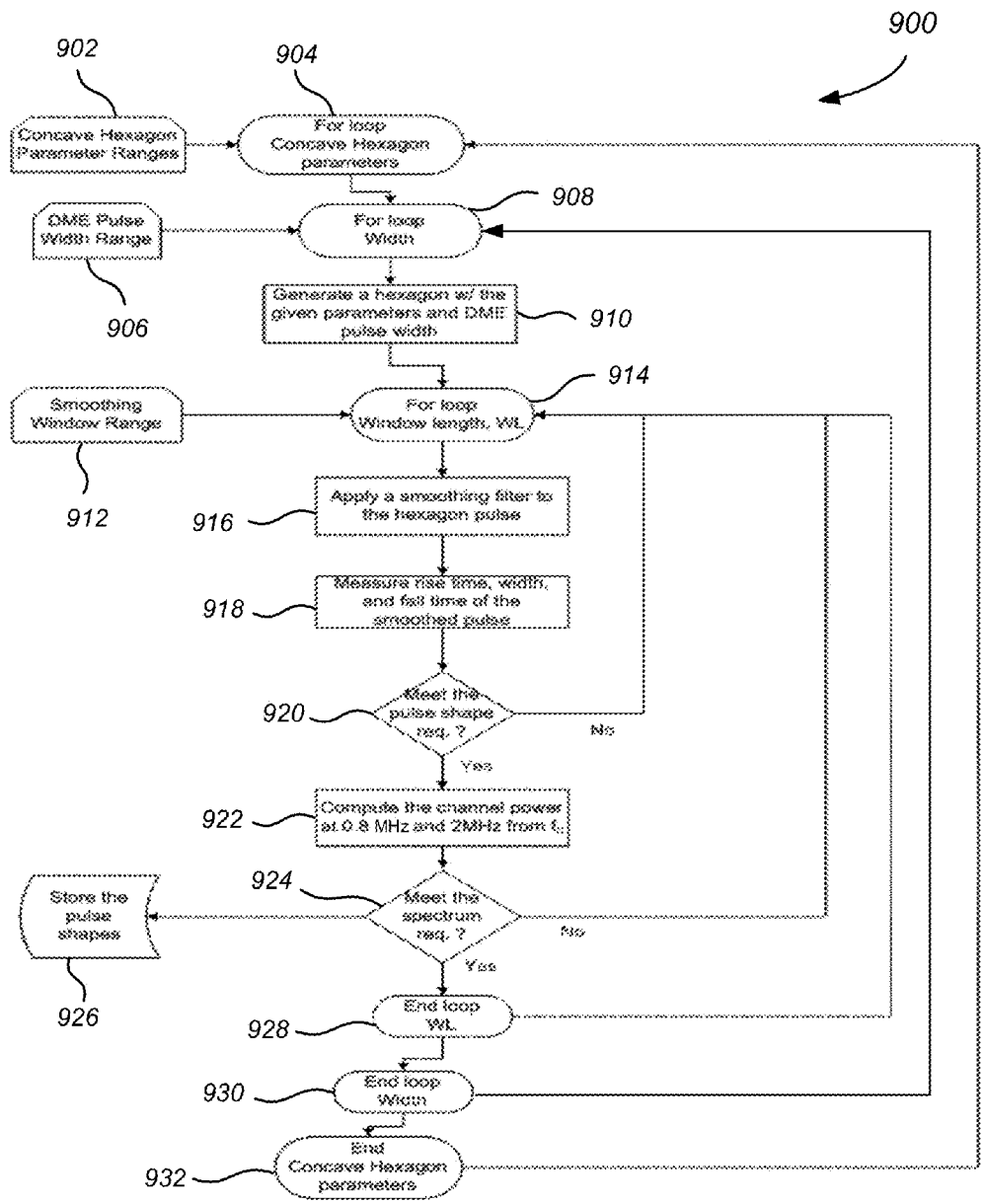
FIG. 9 is a simplified flowchart illustrating a method of searching for a candidate smoothed concave hexagonal pulse shape for DME/N according to an embodiment of the invention.

FIG. 9 is a simplified flowchart illustrating a method of computing a smoothed concave hexagonal pulse (SCP) waveform for DME/N according to an embodiment of the invention. At 902, the system determines the ranges for the baseline concave hexagonal pulse waveform. At 904, the system starts the concave hexagon parameter loop. At 906, the system determines the range for the DME pulse width. At 908, the system starts the "pulse width" loop. At 910, the system generates a baseline concave hexagonal pulse waveform using the given concave hexagon parameters and DME pulse width. At 912, the system determines the range for the smoothing window. At 914, the system starts the "window length" (WL) loop. At 916, the system applies the smooth filter to the baseline concave hexagonal pulse waveform. At 918, the system determines the rise time, pulse width, and the fall time of the smoothed concave hexagonal pulse waveform. At 920, the system checks whether the resultant smoothed concave hexagonal pulse waveform meets the pulse shape requirements. If the answer is "no," the system loops back to 914 where the smoothing window length WL is changed. If the answer is "yes," at 922, the system computes the channel power at 0.8 MHz and 2 MHz from the nominal channel frequency $f_c$. At 922, the system checks if the resultant smoothed concave hexagonal pulse waveform meets the spectrum requirements. If the answer is "no," the system loops back to 914 where the smoothing window length is changed. If the answer is "yes," at 926, the system stores the resultant smoothed concave hexagonal pulse waveform. At 928, the system loops back to 914 where the smoothing window length WL is changed until all values of WL within the smoothing window range have been tried. At 930, the system loops back to 908 where the DME pulse width is changed until all values within the DME pulse width range have been tried. At 932, the system loops back to 904 where the baseline concave hexagonal waveform parameters are changed until all values within the concave hexagon parameter range have been tried.

It should be appreciated that the specific steps illustrated in FIG. 9 provide a particular method of computing a smoothed concave hexagonal pulse waveform for DME/N according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
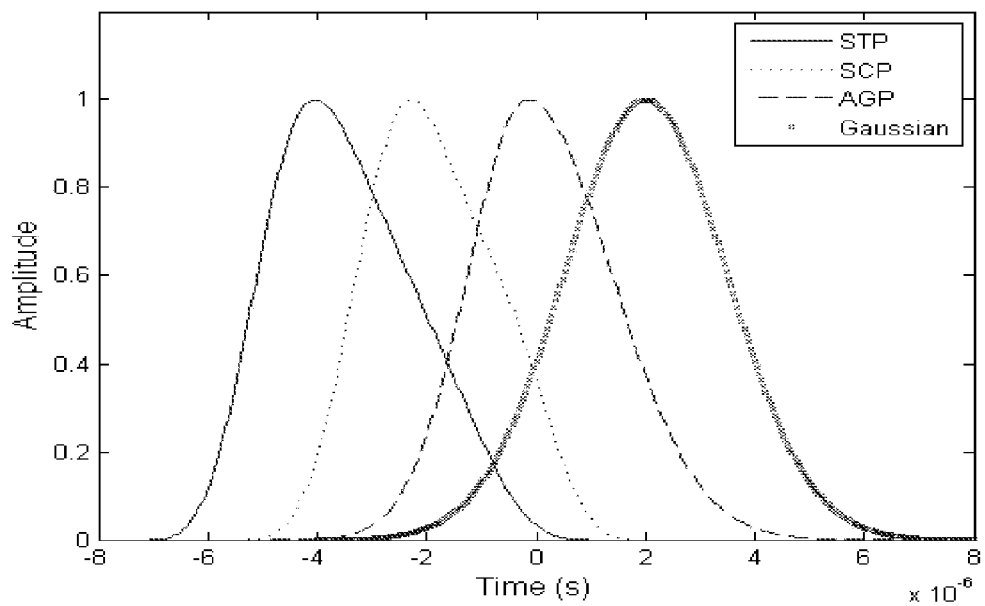
FIG. 10 illustrates a comparison between three exemplary alternative pulse shapes and a Gaussian pulse shape according to embodiments of the invention.

FIG. 10 compares the resultant pulse shapes provided by the methods described herein along with the standard Gaussian pulse. The key pulse shape parameters of the pulses provided by embodiments of the present invention are listed in Table 3. From FIG. 10 and Table 3, two pulse shape characteristics for a better time-of-arrival (TOA) measurement can be identified: the fast rise time and narrow width around the peak. The two characteristics are useful for noise suppression and multipath mitigation among other performance parameters.

TABLE 3

Parameters of the DME/N Alternative Pulses

|  | Gaussian | STP | SCP | AGP |
|---|---|---|---|---|
| Rise Time (μs) | 2.5 | 1.50 | 1.50 | 1.68 |
| Width (μs) | 3.5 | 3.30 | 3.09 | 3.10 |
| Fall Time (μs) | 2.5 | 2.94 | 2.48 | 2.76 |

The alternative pulses illustrated in FIG. 10 yield the most TOA measurement enhancement in each approach under the test of noise and multipath. The TOA performance enhancement is evaluated by injecting random noise and multipath to each candidate alternative pulse and measuring the statistics of the TOA differences resulting from adding the noise or multipath.

Table 4 lists the each test condition and the TOA performance of the various pulses in meters. The statistics (1σ) for the test under noise uses 10,000 samples. r is the peak amplitude ratio of the direct and short distant echoes. The phase difference between the direct and the echo is zero for all the cases. The TOA error statistics for the echo test is the Root-Mean-Square since the errors are mostly positive values. The performance of the Gaussian pulse is also listed and used as the reference performance. The percentage values show the improvements of the TOA errors over the traditional Gaussian pulse.

TABLE 4

Time of Arrival Errors under Noise and Multipath in Meters of the Three Optimal Alternative Pulses

|  | Gaussian | STP | SCP | AGP |
|---|---|---|---|---|
| Noise (SNR = 25 dB) | 10.67 | 6.56 | 6.62 | 6.83 |
|  |  | (39%) | (38%) | (36%) |
| Noise (SNR = 30 dB) | 5.91 | 3.58 | 3.71 | 3.79 |
|  |  | (39%) | (37%) | (36%) |
| Noise (SNR = 40 dB) | 1.85 | 1.15 | 1.16 | 1.19 |
|  |  | (38%) | (38%) | (36%) |
| Echo (r = 0.3) | 23.57 | 15.32 | 13.71 | 15.03 |
|  |  | (35%) | (42%) | (36%) |
| Echo (r = 0.4) | 31.21 | 20.92 | 18.41 | 20.45 |
|  |  | (33%) | (41%) | (34%) |
| Echo (r = 0.5) | 38.82 | 27.17 | 23.54 | 26.26 |
|  |  | (30%) | (39%) | (32%) |

Table 4 shows that the noise suppression performance of the STP is slightly better than the SCP. The difference is less than 13 cm at most. However, the multipath mitigation of the SCP is superior to the others and at least 1.61 meters better than the STP.

Figure 11:
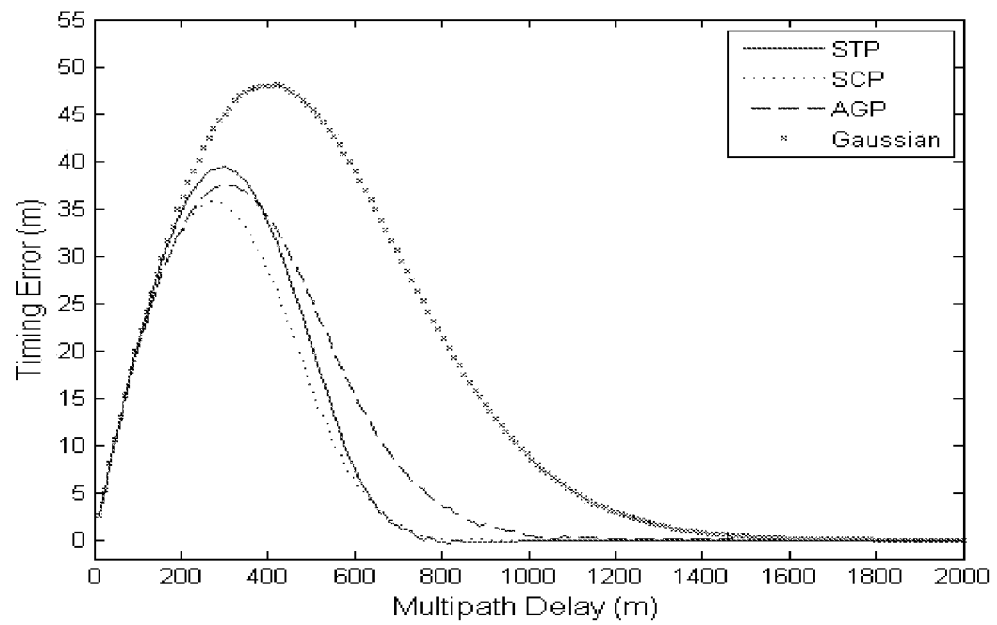
FIG. 11 illustrates time-of-arrival errors as a function of multipath delay for three exemplary alternative pulse shapes according to embodiments of the invention.

FIG. 11 shows the TOA errors with respect to the given multipath delay. The SCP has the lowest peak of the error and the short multipath impact ranges. Therefore, the SCP overall provides the best performance among the three candidates. The optimal SCP approximately has 15 dB margin of 500 kHz band channel power at 800 kHz and 2 MHz from a DME center frequency.

Figure 12:
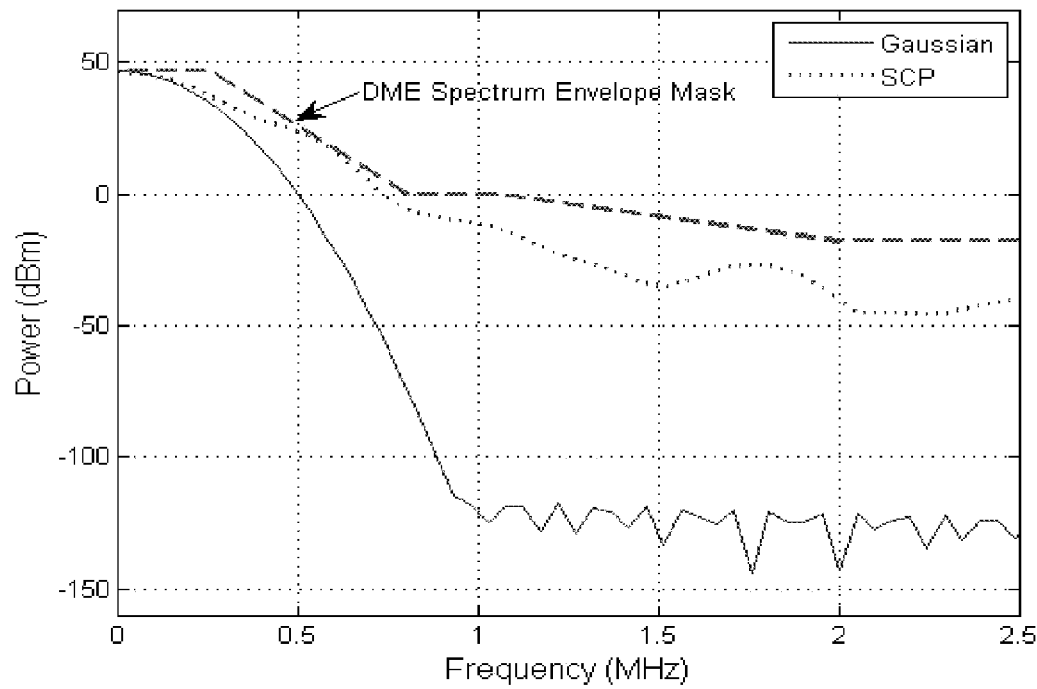
FIG. 12 illustrates power spectra of a Gaussian pulse and of a smoothed concave hexagonal DME/N pulse against a DME spectrum envelope mask, according to an embodiment of the invention.

FIG. 12 compares the power spectrums of the optimal SCP and Gaussian pulse against the DME spectrum envelope mask. The power spectrum of the optimal SCP appears very close to the mask around 600 kHz from the center frequency but is actually below the mask over the given frequency range.

Note that the values of the TOA errors under noise and multipath could be different with respect to a TOA estimation algorithm that is not discussed in this disclosure.

The DME accuracy improvement can be improved (e.g., maximized) when the SCP is implemented in the ground DME transponder and airborne interrogator together. To enable the implementation, the SCP could easily be implemented via software upgrades in DME ground station equipment currently being procured by the FAA. Similar software upgrades to DME avionics may be possible with current state-of-the-art DME/DME avionics. For legacy interrogators, the range accuracy improvement can benefit from ground to air portion of the enhancement.

When the SCP is uploaded to the DME ground station equipment, it could be distorted through various processes in the transmitter such as pulse shaping and power amplification. The largest distortion may be caused by nonlinear RF High Power Amplifiers (HPAs). Although such distortions would have little effect on pulse shape and corresponding range accuracy, if not managed correctly, it could broaden frequency spectrum output (known as 'spectral regrowth') and cause co-channel interference. Such co-channel interference could require mitigation through a reduction in DME ground station transmitter power and result in a reduction in service volume for each DME site. The SCP design has approximately 15 dB margin to account for the possible spectral growth. This margin is expected to be sufficient. If some additional room for the spectral growth is needed, a pre-distortion of the alternative pulse can be used. The pre-distortion corrects the baseline pulse shape before modulation, up-conversion, and amplification thereby creating an output signal closer to the desired pulse shape.

Figure 13:
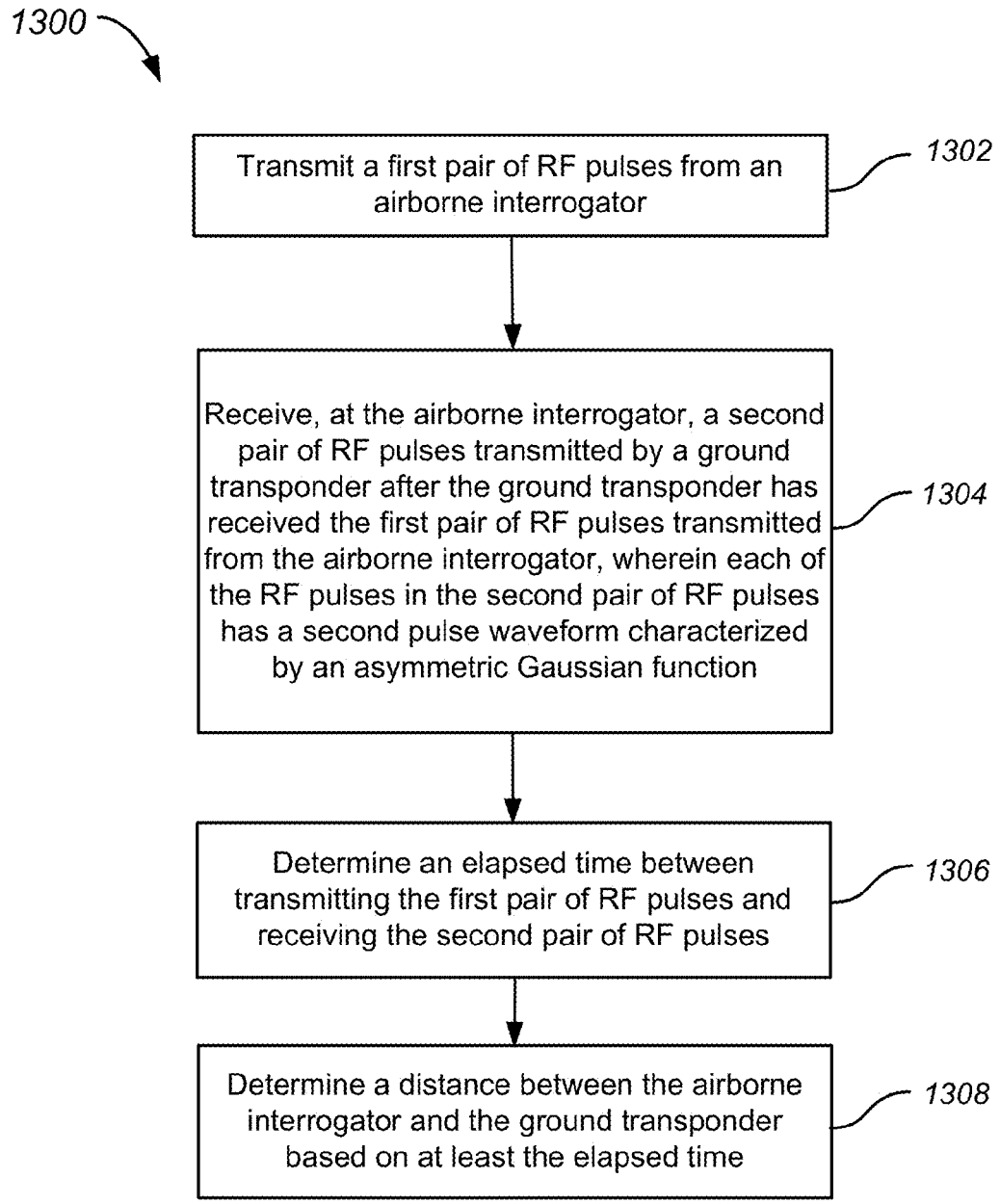
FIG. 13 is a simplified flowchart illustrating a method of measuring distance according to an embodiment of the invention.
Figure 18:
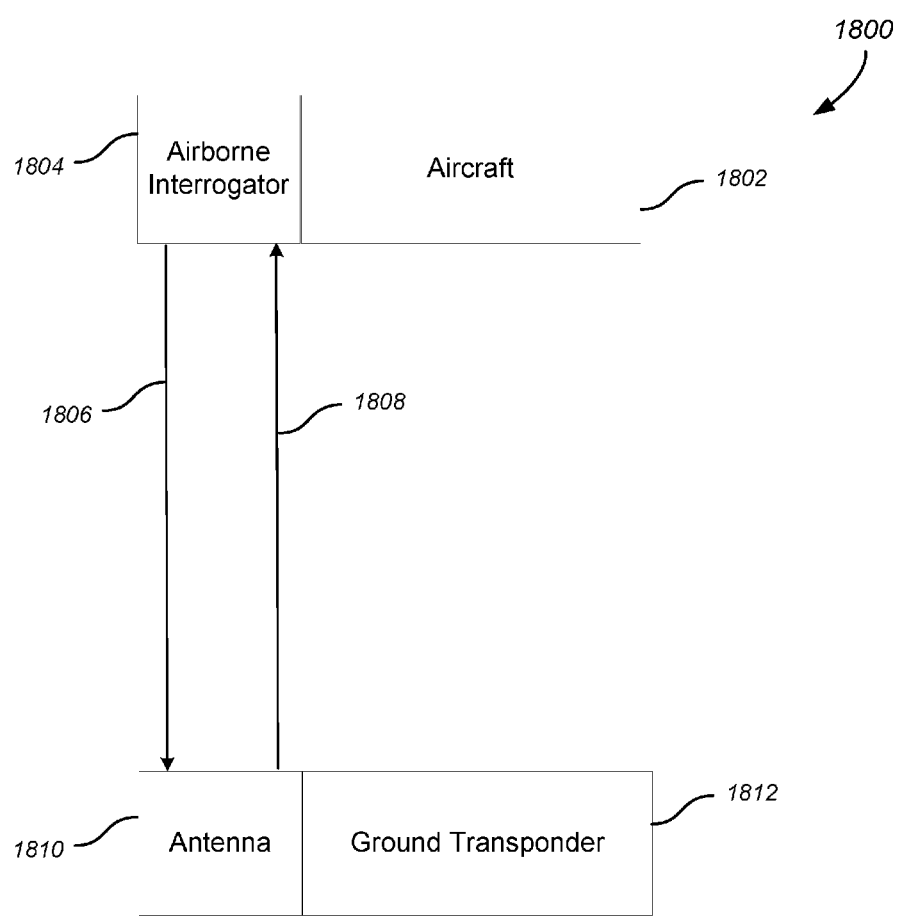
FIG. 18 illustrates a simplified system of an airborne interrogator and ground transponder according to an embodiment of the invention.

FIG. 13 is a simplified flowchart illustrating a method for measuring distance according to an embodiment of the invention in association with the system in FIG. 18. At 1302, an airborne interrogator 1804 transmits a first pair of RF pulses 1806. The RF pulses in the first pair of RF pulses 1806 are temporally separated from each other by a first time interval. Each of the RF pulses in the first pair of RF pulses has a first pulse waveform. At 1304, the airborne interrogator 1804 receives a second pair of RF pulses 1808 transmitted by a ground transponder 1812 (e g using the antenna 1810 associated with the ground transponder 1812, etc.) after the ground transponder 1812 has received the first pair of RF pulses 1806 transmitted from the airborne interrogator 1804. The RF pulses in the second pair of RF pulses 1808 are temporally separated from each other by a second time interval. Each of the RF pulses in the second pair of RF pulses 1808 has a second pulse waveform characterized by a filtered asymmetric Gaussian function. At 1306, the airborne interrogator 1804 determines an elapsed time between transmitting the first pair of RF pulses 1806 and receiving the second pair of RF pulses 1808. At 1308, the airborne interrogator 1804 determines a distance between the airborne interrogator 1804 and the ground transponder 1812 based on at least the elapsed time.

It should be appreciated that the specific steps illustrated in FIG. 13 provide a particular method for measuring distance according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
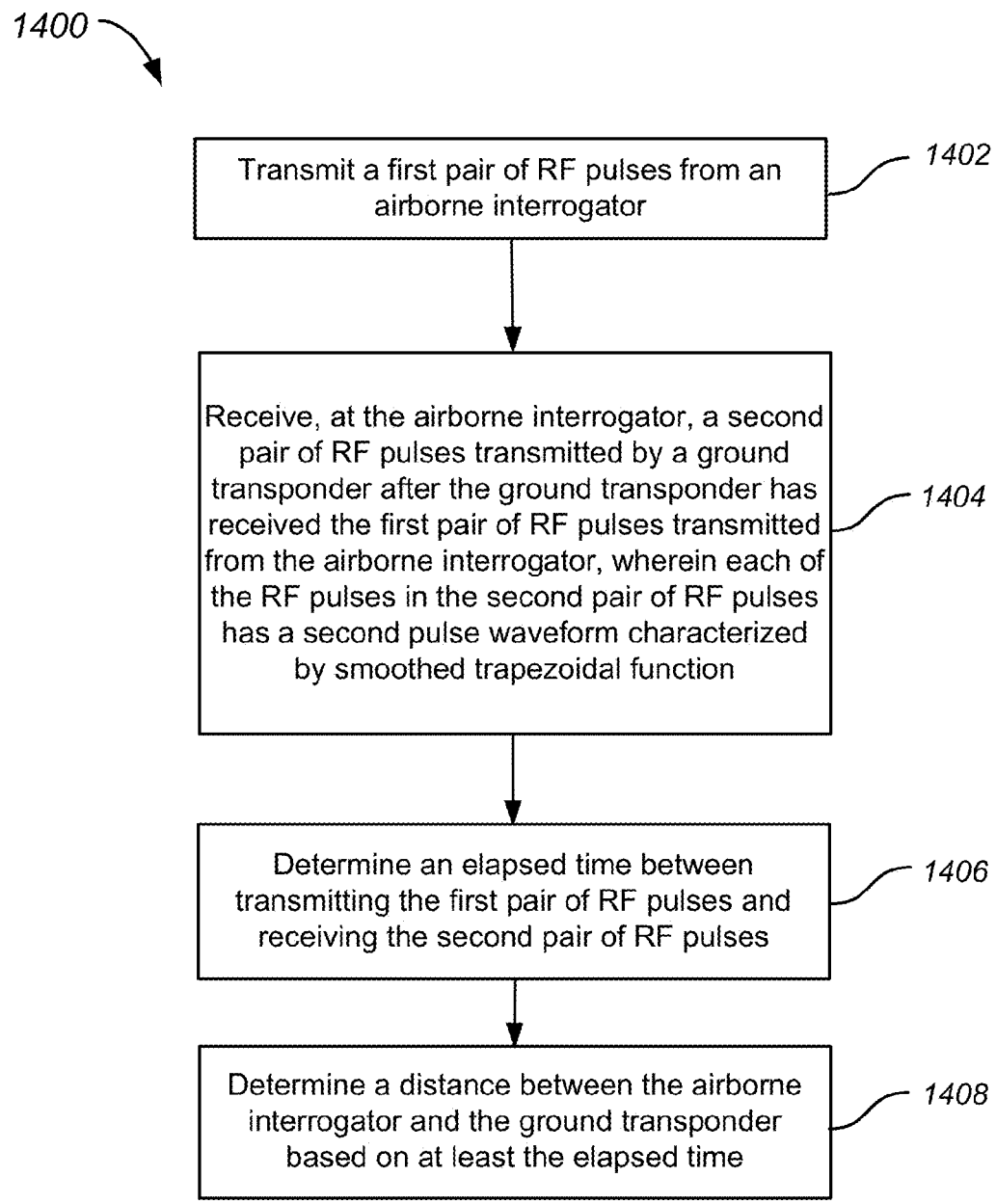
FIG. 14 is a simplified flowchart illustrating a method of measuring distance according to another embodiment of the invention.

FIG. 14 is a simplified flowchart illustrating a method for measuring distance according to an embodiment of the invention. At 1402, an airborne interrogator transmits a first pair of RF pulses. The RF pulses in the first pair of RF pulses are temporally separated from each other by a first time interval. Each of the RF pulses in the first pair of RF pulses has a first pulse waveform. At 1404, the airborne interrogator receives a second pair of RF pulses transmitted by a ground transponder after the ground transponder has received the first pair of RF pulses transmitted from the airborne interrogator. The RF pulses in the second pair of RF pulses are temporally separated from each other by a second time interval. Each of the RF pulses in the second pair of RF pulses has a second pulse waveform characterized by a smoothed trapezoidal function. The baseline trapezoidal function is characterized by a first segment having a first positive slope, a second flat segment, and a third segment having a second negative slope. The absolute value of the first positive slope is greater than the absolute value of the second negative slope. At 1406, the airborne interrogator determines an elapsed time between transmitting the first pair of RF pulses and receiving the second pair of RF pulses. At 1408, the airborne interrogator determines a distance between the airborne interrogator and the ground transponder based on at least the elapsed time.

It should be appreciated that the specific steps illustrated in FIG. 14 provide a particular method for measuring distance according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
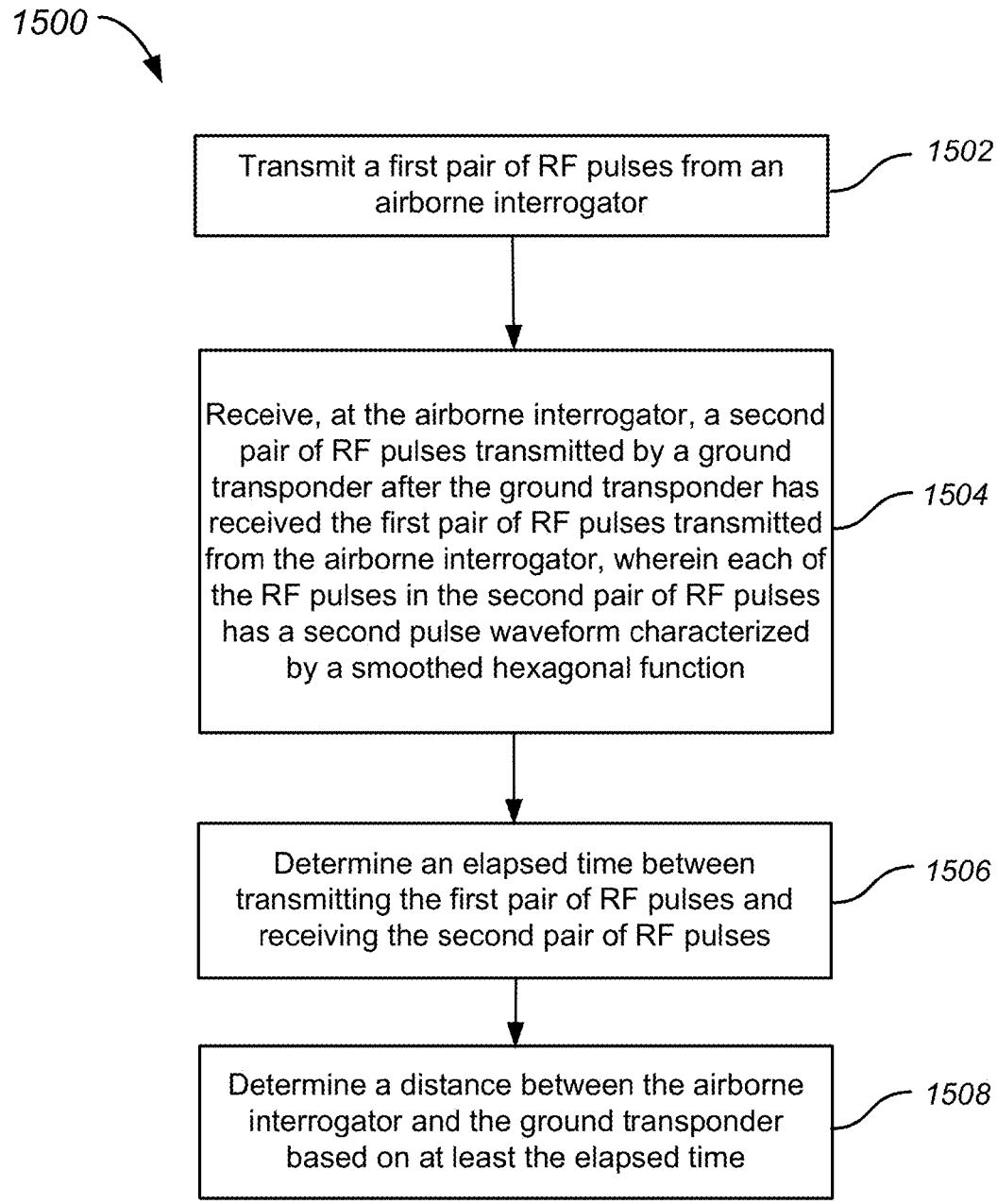
FIG. 15 is a simplified flowchart illustrating a method of measuring distance according to a specific embodiment of the invention.

FIG. 15 is a simplified flowchart illustrating a method for measuring distance according to an embodiment of the invention. At 1502, an airborne interrogator transmits a first pair of RF pulses. The RF pulses in the first pair of RF pulses are temporally separated from each other by a first time interval. Each of the RF pulses in the first pair of RF pulses has a first pulse waveform. At 1504, the airborne interrogator receives a second pair of RF pulses transmitted by a ground transponder after the ground transponder has received the first pair of RF pulses transmitted from the airborne interrogator. The RF pulses in the second pair of RF pulses are temporally separated from each other by a second time interval. Each of the RF pulses in the second pair of RF pulses has a second pulse waveform characterized by a smoothed concave hexagonal function. The baseline concave hexagonal function is characterized by a first segment having a first positive slope, a second flat segment, a third segment having a second negative slope, a fourth segment having a third negative slope, and a fifth segment having a fourth negative slope. The absolute value of the third negative slope is less than the absolute value of the second negative slope. At 1506, the airborne interrogator determines an elapsed time between transmitting the first pair of RF pulses and receiving the second pair of RF pulses. At 1508, the airborne interrogator determines a distance between the airborne interrogator and the ground transponder based on at least the elapsed time.

It should be appreciated that the specific steps illustrated in FIG. 15 provide a particular method for measuring distance according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
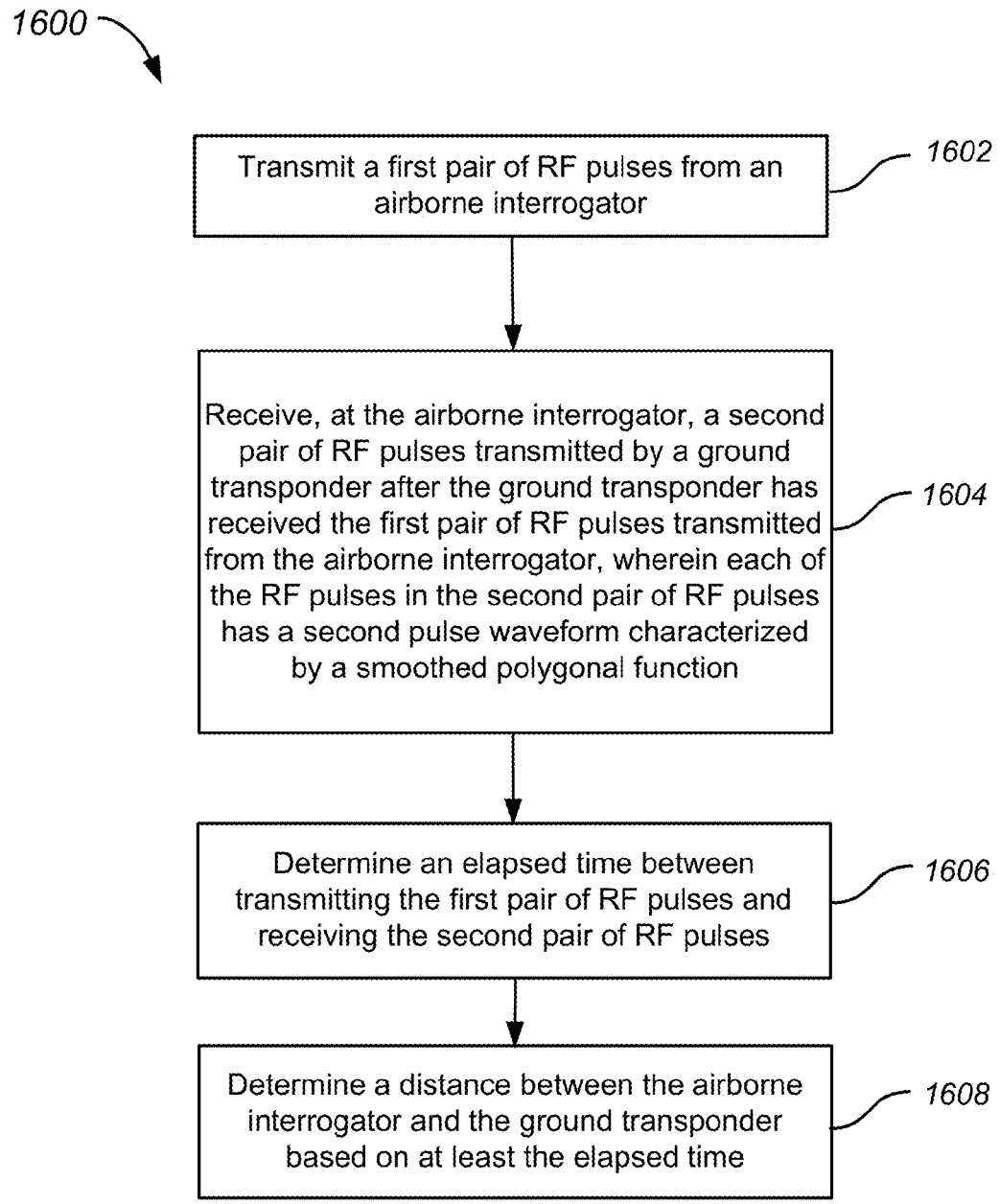
FIG. 16 is a simplified flowchart illustrating a method of measuring distance according to another specific embodiment of the invention.

FIG. 16 is a simplified flowchart illustrating a method for measuring distance according to an embodiment of the invention. At 1602, an airborne interrogator transmits a first pair of RF pulses. The RF pulses in the first pair of RF pulses are temporally separated from each other by a first time interval. Each of the RF pulses in the first pair of RF pulses has a first pulse waveform. At 1604, the airborne interrogator receives a second pair of RF pulses transmitted by a ground transponder after the ground transponder has received the first pair of RF pulses transmitted from the airborne interrogator. The RF pulses in the second pair of RF pulses are temporally separated from each other by a second time interval. Each of the RF pulses in the second pair of RF pulses has a second pulse waveform characterized by a smoothed concave polygonal function. The baseline concave polygonal function is characterized by at least a first segment having a first positive slope, a second flat segment, a third segment having a second negative slope, a fourth segment having a third negative slope, and a fifth segment having a fourth negative slope. The absolute value of the third negative slope is less than the absolute value of the second negative slope. At 1606, the airborne interrogator determines an elapsed time between transmitting the first pair of RF pulses and receiving the second pair of RF pulses. At 1608, the airborne interrogator determines a distance between the airborne interrogator and the ground transponder based on at least the elapsed time.

In some embodiments, the second pulse waveform may be characterized by a waveform function. For example, the waveform function can include a filtered asymmetric Gaussian function or a smoothed trapezoidal function. The waveform function may be obtained by applying a smoothing operation on the trapezoidal function. The filtered asymmetric Gaussian function may be characterized by a rise time, a fall time, and a pulse width. The rise time may be greater than or equal to about 1.5 μs and less than or equal to about 3.0 μs, the fall time may be greater than or equal to about 2.0 μs and less than or equal to about 3.0 μs, and the pulse width may be greater than or equal to about 3.0 μs and less than or equal to about 4.0 μs. The filtered asymmetric Gaussian function may be characterized by a standard deviation on a rising edge that is greater than or equal to about 0.77 μs and less than or equal to about 1.77 μs, and a standard deviation on a falling edge that is greater than or equal to about 0.90 μs and less than or equal to about 1.78 μs. The waveform function may be a smoothed trapezoidal function, and the smoothed trapezoidal function may be characterized by a first segment having a first positive slope, a second flat segment, and a third segment having a second negative slope, an absolute value of the first positive slope being greater than an absolute value of the second negative slope. The airborne interrogator may measure a slant range by the elapsed time between transmitting the first pair of RF pulses and receiving the second pair of RF pulses. The first pair of RF pulses may be transmitted at a power of more than about 800 Watts, including 1,000 Watts.

It should be appreciated that the specific steps illustrated in FIG. 16 provide a particular method for measuring distance according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
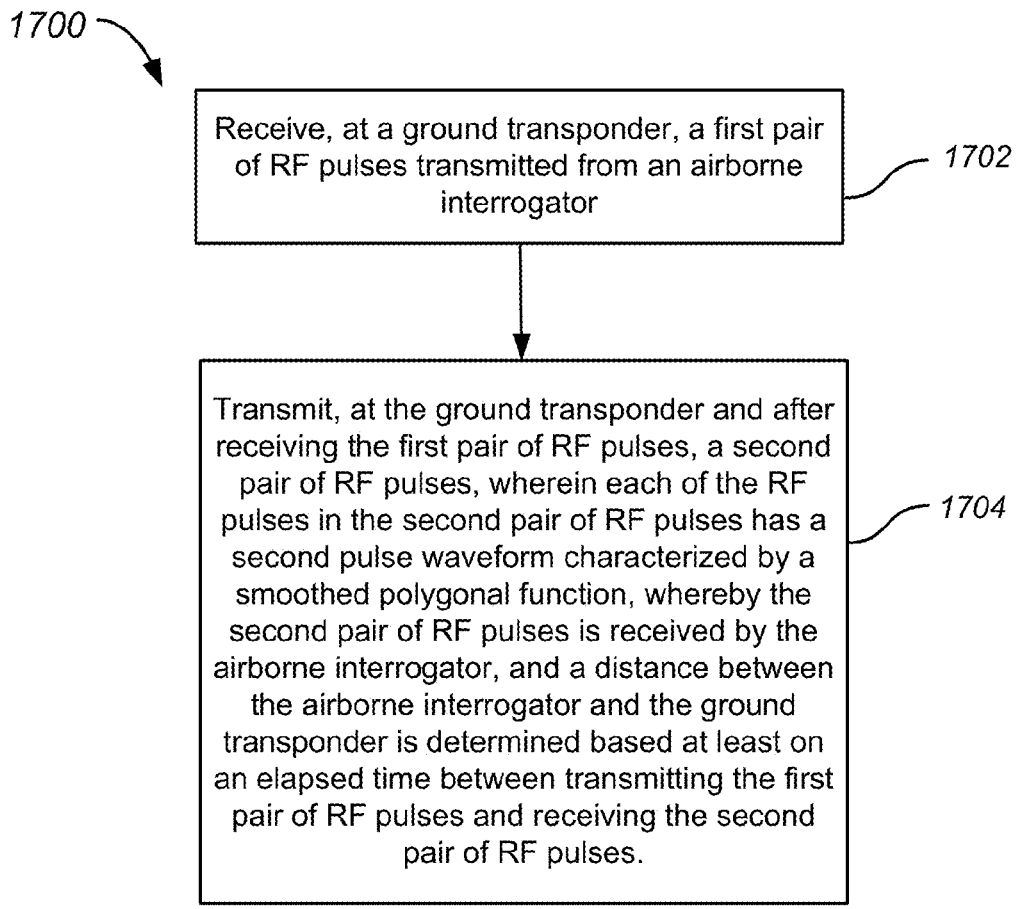
FIG. 17 is a simplified flowchart illustrating a method of measuring distance according to a further specific embodiment of the invention.

FIG. 17 is a simplified flowchart illustrating a method for measuring distance according to an embodiment of the invention. At 1702, a ground transponder receives a first pair of RF pulses transmitted from an airborne interrogator. The RF pulses in the first pair of RF pulses are temporally separated from each other by a first time interval. Each of the RF pulses in the first pair of RF pulses has a first pulse waveform. At 1704, the ground transponder transmits a second pair of RF pulses after receiving the first pair of RF pulses. The RF pulses in the second pair of RF pulses are temporally separated from each other by a second time interval. Each of the RF pulses in the second pair of RF pulses has a second pulse waveform characterized by a smoothed concave polygonal function. The baseline concave polygonal function is characterized by at least a first segment having a first positive slope, a second flat segment, a third segment having a second negative slope, a fourth segment having a third negative slope, and a fifth segment having a fourth negative slope. The absolute value of the third negative slope is less than the absolute value of the second negative slope. The second pair of RF pulses is to be received by the airborne interrogator, thereby a distance between the airborne interrogator and the ground transponder is determined based on at least an elapsed time between transmitting the first pair of RF pulses and receiving the second pair of RF pulses. In alternative embodiments of the present invention, the second pulse waveform is characterized by a filtered asymmetric Gaussian function, a smoothed trapezoidal function, a smoothed concave hexagonal function, or the like, as described throughout this disclosure.

It should be appreciated that the specific steps illustrated in FIG. 17 provide a particular method for measuring distance according to an embodiment of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention provide alternative DME/N pulse shapes that can provide significant range accuracy improvement over the standard Gaussian pulse without a loss of coverage. As discussed above, the smoothed concave hexagonal pulse (SCP) provides significant improvement in range accuracy in comparison with conventional pulses. The SCP is compliant with the pulse shape and spectrum requirements of the current DME specification. From the simulation of noise and short distant echoes, the SCP showed range accuracy improvement about 37~38% against the noise with 25~40 dB SNR and about 39~42% improvement against the constructive short distance echoes with the direct and echo amplitude ratio of 0.3~0.5.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for measuring distance, the method comprising:
    transmitting a first RF pulse from an airborne interrogator, wherein the first RF pulse has a first pulse waveform;
    receiving, at the airborne interrogator, a second RF pulse transmitted by a ground transponder after the ground transponder has received the first RF pulse transmitted from the airborne interrogator,
    wherein the second RF pulse has a second pulse waveform characterized by a filtered asymmetric Gaussian function formed by:
        generating a single pulse having a first segment connected to a second segment, the first segment having a rise time between 1.5 µs and 3.0 µs and the second segment having a fall time between 2.0 µs and 3.0 µs, wherein the single pulse has a pulse width defined from a start of the first segment to an end of the second segment of between 3.0 µs and 4.0 µs, and
    applying a smoothing operation to the single pulse;
    determining an elapsed time between transmitting the first RF pulse and receiving the second RF pulse; and
    determining a distance between the airborne interrogator and the ground transponder based on at least the elapsed time.

2. The method of claim 1 wherein the filtered asymmetric Gaussian function further comprises:
    receiving a third RF pulse transmitted from the airborne interrogator, wherein the third RF pulse is characterized by a rising edge and a falling edge;
    determining a first standard deviation between the rising edge of the third RF pulse and the first segment of the second RF pulse, wherein the first standard deviation of the rising edge and the first segment is between 0.77 µs and 1.77 µs; and
    determining a second standard deviation between the falling edge of the third RF pulse and the second segment of the second RF pulse is between 0.90 µs and 1.78 µs.

3. The method of claim 2 wherein the first standard deviation on the rising edge is less than the second standard deviation on the falling edge.

4. The method of claim 3 wherein the first standard deviation on the rising edge is between 0.77 µs and 1.0 µs.

5. The method of claim 1 wherein the first pulse waveform is characterized by the filtered asymmetric Gaussian function.

6. The method of claim 1 wherein the second RF pulse has a power of more than 800 Watts.

7. The method of claim 1 wherein a time interval between the first RF pulse and the second RF pulse is substantially equal to subsequent time intervals between RF pulses.

8. The method of claim 1 wherein the smoothing operation is performed by a moving average filter, a spline filter, or a zero phase forward and backward digital filter.

9. A method for measuring distance, the method comprising:
- transmitting a first RF pulse from an airborne interrogator, wherein the first RF pulse has a first pulse waveform;
- receiving, at the airborne interrogator, a second RF pulse transmitted by a ground transponder after the ground transponder has received the first RF pulse transmitted by the airborne interrogator,
- wherein the second RF pulse has a second pulse waveform characterized by a smoothed trapezoidal function formed by:
  - generating a single pulse having a first segment connected to a second flat segment connected to a third segment, the first segment having a first positive slope, and the third segment having a second negative slope, wherein the first positive slope is steeper than the second negative slope, and
  - applying a smoothing operation to the single pulse;
- determining an elapsed time between transmitting the first RF pulse and receiving the second RF pulse; and
- determining a distance between the airborne interrogator and the ground transponder based on at least the elapsed time.

10. The method of claim 9 wherein the first segment having a rise time between 1.5 µs and 3.0 µs, the third segment having a fall time between 2.0 µs and 3.0 µs, and the single pulse has a pulse width defined from a start of the first segment to an end of the third segment of between 3.0 µs and 4.0 µs.

11. The method of claim 9 wherein the first positive slope is greater than 0.7 µs$^{-1}$.

12. The method of claim 9 wherein the second RF pulse has a power of more than 800 Watts.

13. The method of claim 9 wherein the smoothing operation is performed by a moving average filter, a spline filter, or a zero phase forward and backward digital filter.

14. A system for distance measuring comprising:
- an airborne interrogator operable to transmit a first RF pulse having a first pulse waveform; and
- a ground transponder operable to
  - receive the first RF pulse transmitted by the airborne interrogator,
  - generate a second RF pulse after receiving the first RF pulse, wherein the second RF pulse has a second pulse waveform characterized by a filtered asymmetric Gaussian function formed by:
    - generating a single pulse having a first segment connected to a second segment, the first segment having a rise time between 1.5 µs and 3.0 µs and the second segment having a fall time between 2.0 µs and 3.0 µs, wherein the single pulse has a pulse width defined from a start of the first segment to an end of the second segment of between 3.0 µs and 4.0 µs, and
    - applying a smoothing operation to the single pulse to generate the second RF pulse, and
  - transmitting the second RF pulse to the airborne interrogator;
- wherein the airborne interrogator is further operable to receive the second RF pulse transmitted by the ground transponder, whereby a distance between the airborne interrogator and the ground transponder is determined based on at least an elapsed time between transmitting the first RF pulse and receiving the second RF pulse.

15. The system of claim 14 wherein the filtered asymmetric Gaussian function further comprises:
- receiving a third RF pulse transmitted from the airborne interrogator, wherein the third RF pulse is characterized by a rising edge and a falling edge;
- determining a first standard deviation between the rising edge of the third RF pulse and the first segment of the second RF pulse, wherein the first standard deviation of the rising edge and the first segment is between 0.77 µs and 1.77 µs; and
- determining a second standard deviation between the falling edge of the third RF pulse and the second segment of the second RF pulse is between 0.90 µs and 1.78 µs.

16. The system of claim 14 wherein the airborne interrogator measures a slant range by the elapsed time between transmitting the first RF pulse and receiving the second RF pulse.

17. The system of claim 14 wherein the first RF pulse is transmitted at a power of more than 800 Watts.

18. The system of claim 14 further comprising:
- receiving a third RF pulse transmitted by the ground transponder; and
- determining a standard deviation of one or more segments from the second RF pulse and third RF pulse.

* * * * *